United States Patent [19]
Zou et al.

[11] Patent Number: 5,981,625
[45] Date of Patent: Nov. 9, 1999

[54] NON-RUB OFF PRINTING INKS

[75] Inventors: Wan Kang Zou; Xiaomang Wang; Qiao Qiao Dong, all of Northbrook, Ill.

[73] Assignee: Videojet Systems International, Inc., Wooddale, Ill.

[21] Appl. No.: 08/642,700

[22] Filed: May 2, 1996

Related U.S. Application Data

[63] Continuation-in-part of application No. 08/494,122, Jun. 23, 1995, abandoned.

[51] Int. Cl.$^6$ .................................................. C09D 11/10
[52] U.S. Cl. ........................ 523/161; 523/200; 523/215; 260/DIG. 38; 524/288; 524/446; 524/447; 524/484; 524/486; 524/495; 524/496
[58] Field of Search .................................. 523/161, 200, 523/215; 260/DIG. 38; 524/445, 446, 447, 484, 486, 495, 496, 288

[56] References Cited

U.S. PATENT DOCUMENTS

| | | | |
|---|---|---|---|
| 3,028,349 | 4/1962 | Rowldand et al. | 106/237 |
| 4,036,136 | 7/1977 | Takagi | 101/467 |
| 4,419,132 | 12/1983 | Moynihan | 106/31.67 |
| 4,773,932 | 9/1988 | Gamblin | 106/31.66 |
| 5,122,188 | 6/1992 | Erhan et al. | 106/31.66 |
| 5,543,219 | 8/1996 | Elwakil | 428/402.24 |
| 5,622,548 | 4/1997 | Zou et al. | 106/20 C |

FOREIGN PATENT DOCUMENTS

| | | |
|---|---|---|
| 2077097 | 10/1971 | France . |
| 2232583 | 1/1975 | France . |
| 103 2002 | 7/1983 | U.S.S.R. . |
| 170 8821 | 1/1992 | U.S.S.R. . |
| 1346816 | 2/1974 | United Kingdom . |
| 1470655 | 4/1977 | United Kingdom . |

*Primary Examiner*—Marion McCamish
*Assistant Examiner*—John J. Guarriello
*Attorney, Agent, or Firm*—Leydig, Voit & Mayer, Ltd.

[57] ABSTRACT

The present invention provides a newspaper printing ink that has rub off resistance; is fast drying on the paper; does not mist or dry on the press; offers excellent printability, high color strength, good water balance, and sharp half tone reproduction; and is relatively inexpensive. The present invention provides an ink concentrate suitable for preparing the printing ink, the ink concentrate comprising a colorant having a particle size of from about 0.01 $\mu$m to about 25 $\mu$m, a hydrocarbon resin, and a binder resin selected from the group consisting of a polyamide-oil polymer and a polyester-oil polymer. The present invention further provides a printing ink comprising a colorant having a particle size of from about 0.01 $\mu$m to about 25 $\mu$m, a vegetable oil, a polyamide-oil polymer, and a styrene-acrylic copolymer. The present invention further provides a printing ink comprising a naphthenic oil, a colorant having a particle size of from about 0.01 $\mu$m to about 25 $\mu$m, a hydrocarbon resin, and a polyester-oil polymer. The present invention further provides a continuous process for preparing the ink and the ink concentrate.

29 Claims, 2 Drawing Sheets

NON-RUB OFF PRINTING INKS

CROSS REFERENCE TO A RELATED APPLICATION

This is a continuation-in-part application of copending U.S. patent application Ser. No. 08/494,122, now abd. filed Jun. 23, 1995.

TECHNICAL FIELD OF THE INVENTION

The present invention relates to printing inks, and particularly to newspaper printing inks that have excellent non-rub off characteristics.

BACKGROUND OF THE INVENTION

Conventional newsprinting inks are generally composed of a colorant such as carbon black, a mineral oil having a high viscosity, a mineral oil having a low viscosity, and a resin. Certain problems have been encountered in using such inks in newsprinting. For instance, these inks do not adhere strongly to the newspaper with the result that the ink tends to smudge and transfer to the reader's hands.

Attempts have been made to alleviate this problem by designing alternate printing methods. Newspaper is generally printed either by offset printing or by letterpress printing, each printing method having certain advantages and disadvantages.

Offset printing generally produces higher quality images on newsprint than letterpress printing because offset printing is planographic, i.e., the character and background structure areas on the printing plate are at the same height, and because in offset printing the ink is applied by means of a conformable rubber cylinder. With offset printing the ink is relatively gently applied to the surface of the paper by this conformable rubber cylinder and thus tends to rub off to a great extent. This problem is particularly severe in the case of newspapers printed with offset printing press because of the nature of the ink generally used to print newspapers. On the other hand, images produced by offset printing appear to have stronger colors when colored ink is used and are darker when black ink is used.

Although a letterpress printing press strikes the surface of the paper with greater force than an offset printing press, newspapers printed with conventional newspaper inks on letterpress printing presses are also subject to rub off. In an attempt to improve the appearance of letterpress printing, letterpress printers have been applying ink films to newsprint that are heavier than the ink films previously used. The use of such heavy ink films exacerbates the tendency of the ink to be rubbed off when the newspaper is handled by the reader.

Attempts have also been made in the industry to solve this rub off problem by developing certain new ink formulations. However, none of the inks heretofore known have completely eliminated the rub off problem.

U.S. Pat. No. 4,773,932 discloses a printing ink comprising a pigment, an oil, and a tall oil pitch useful as a letterpress or offset ink that reduces rub off to an extent that is significantly lower than the rub off generally associated with conventional newspaper inks. The exemplified inks had 10% and 50% of the rub off of a conventional ink as determined by the standard rub off test of the American Newspaper Publishers Association (ANPA) of Reston, Va.

U.S. Pat. No. 4,419,132 discloses a newspaper printing ink consisting of a pigment, a Gilsonite resin, and a tall oil fatty acid. The ink of the '132 patent is directed to the problem of limiting rub off in a particular manner. Thus the reported invention does not eliminate the rub off completely.

U.S. Pat. No. 5,122,188 discloses a vegetable oil based printing ink formulation stated to have low rub off characteristics comprising a vehicle consisting essentially of a substantially non-oxidized heat bodied vegetable oil, the vegetable oil having a molecular weight of about 2600–8900, a viscosity of about 1.6–18 poises and a color on the Gardner Color Scale of about 6 or less.

U.S. Pat. No. 3,028,349 discloses certain moisture setting printing inks having high gloss and suitable for printing weekly and monthly magazines comprising an imine modified acidic resin. Examples of disclosed imines include the trifunctional imines, tri-(1,2)-propylene phosphoramide and the sulfur analog, tri-(1,2)-propylene thiophosphoramide. Examples of acidic resins disclosed include fumarated rosin resin, alcohol soluble maleic resin, and modified phenol resin having an acid number of 60–90. The reaction product of the acidic resin and the imine is used to prepare the moisture setting high gloss inks. Acid number of a sample is the milligrams of KOH required to neutralize the acid groups in 1 gram of the sample.

Copending and commonly owned U.S. patent applications Ser. Nos. 07/909,977, filed Jul. 7, 1992, and 08/267,039, filed Jun. 27, 1994, disclose certain encapsulated pigments suitable for use in printing inks and in magnetic recording media. The pigment is encapsulated by a composition comprising a vegetable oil such as soya oil and optionally an ionomer such as polyethylene-acrylic acid copolymer.

From the foregoing, it is clear that there exists a need for a non-rub off printing ink that is suitable for use in newsprinting, and particularly for use in newsprinting by letterpress printing or by offset printing.

In addition to having non-rub off characteristics, the printing ink should be fast-drying because of the short time between printing and packaging for delivery to the reader. The ink should also possess other desirable characteristics such as excellent printability, high color strength, good water balance, and sharp halftone reproduction. The ink should not mist or dry on the press. The ink should also be manufacturable at a reasonable cost.

Thus there exists a need for a newspaper printing ink that has non-rub off characteristic, is fast drying on the paper, does not dry on the press, and offers excellent printability, high color strength, good water balance, low mist, and sharp halftone reproduction, and that can be produced at a reasonable cost.

SUMMARY OF THE INVENTION

The foregoing needs have been fulfilled by the present invention which provides a newspaper printing ink that has non-rub off characteristics; is fast drying on the paper; does not dry on the press; offers excellent printability, high color strength, good water balance, less mist, and sharp halftone reproduction; and is relatively inexpensive.

The present invention provides a printing ink comprising a colorant having a particle size of from about 0.01 $\mu$m to about 25 $\mu$m, a vegetable oil, a polyamide-oil polymer, and a film forming a polymer comprising both hydrophilic and hydrophopbic groups.

The present invention further provides a printing ink comprising a naphthenic oil, a colorant having a particle size of from about 0.01 $\mu$m to about 25 $\mu$m, a hydrocarbon resin, and a polyester-oil polymer.

The present invention further provides an ink concentrate, suitable for preparing a non-rub off printing ink, the concentrate comprising a colorant having a particle size of from about 0.01 μm to about 25 μm, a hydrocarbon resin, and a binder resin selected from the group consisting of a polyamide-oil polymer and a polyester-oil polymer.

The present invention further provides an improved printing process for producing non-rub off prints having high color strength, good water balance, and sharp halftone reproduction, the improvement comprising using a printing ink comprising a colorant having a particle size of from about 0.01 μm to about 10 μm, a vegetable oil, a polyamide-oil polymer, and a film forming component comprising both hydrophilic and hydrophobic groups.

The present invention further provides an improved printing process for producing non-rub off prints having high color strength, good water balance, and sharp halftone reproduction, the improvement comprising using a printing ink comprising a colorant having a particle size of from about 0.01 μm to about 10 μm, a hydrocarbon resin, and a polyester-oil polymer.

The present invention further provides a process for preparing a non-rub off printing ink comprising (a) preparing a first dispersion vehicle comprising a naphthenic oil, a hydrocarbon resin, a polyester-oil polymer, and a dispersing agent; (b) preparing an ink concentrate by combining the first dispersion vehicle and a colorant having a particle size of from about 0.01 μm to about 25 μm; and (c) combining the ink concentrate with a naphthenic oil and a dispersing agent.

The present invention further provides a process for preparing a non-rub off printing ink comprising (a) preparing a first dispersion vehicle comprising a naphthenic oil, a hydrocarbon resin, a polyester-oil polymer, and a dispersing agent; (b) preparing a second dispersion vehicle comprising a naphthenic oil, a hydrocarbon resin, and a polyester-oil polymer; and (c) combining the first and second dispersion vehicles with a colorant having a particle size of from about 0.01 μm to about 25 μm.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
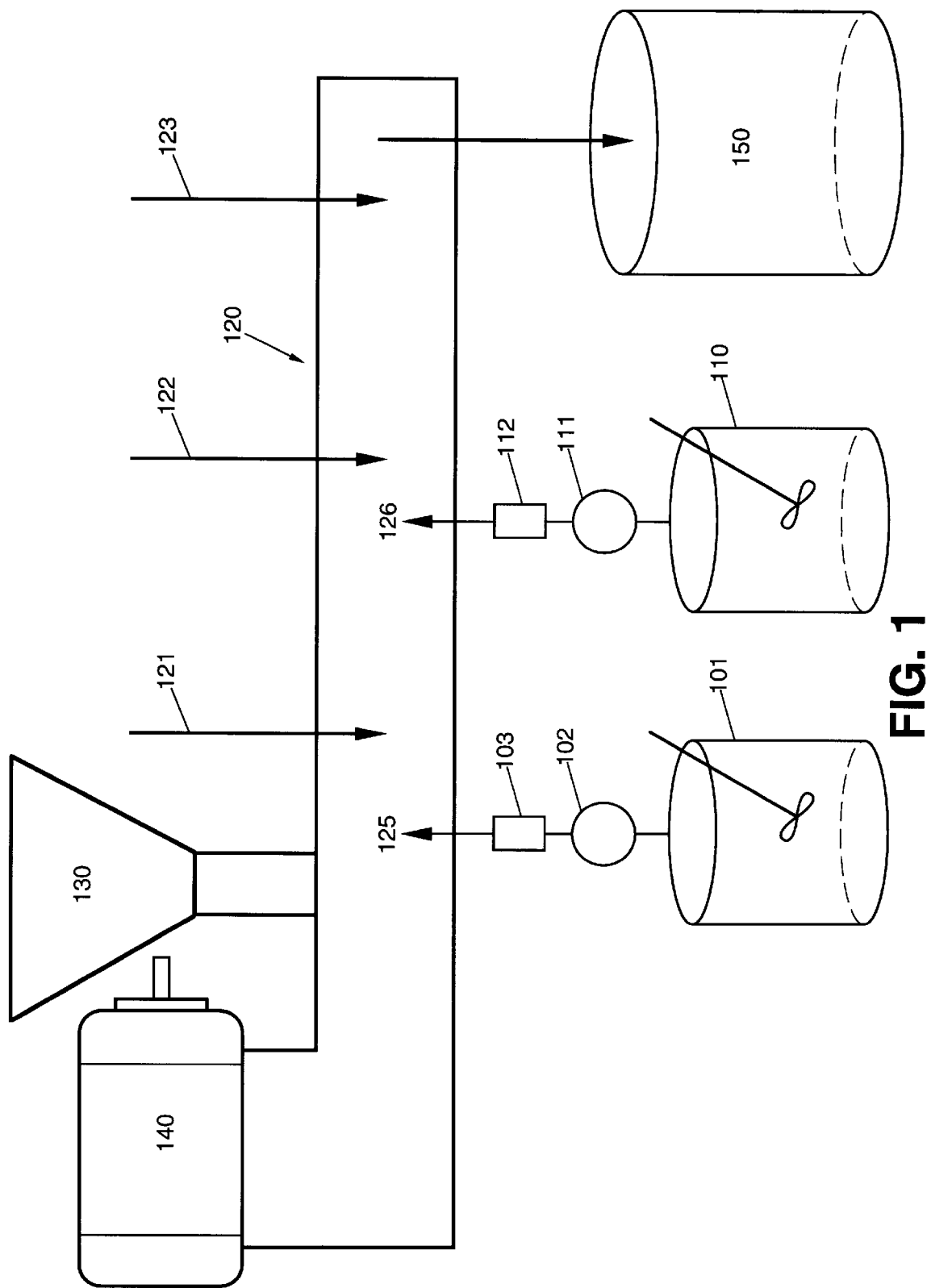
FIG. 1 is a schematic diagram of the continuous processing apparatus used to prepare an ink concentrate and a printing ink of the present invention.

The present invention provides a printing ink that has non-rub off characteristics; is fast drying on the paper; does not dry on the press; and offers excellent printability, high color strength, good water balance, less mist, and sharp halftone reproduction; and is relatively inexpensive. The printing ink is particularly suitable for newsprinting.

The newsprinting ink of the present invention has the following parameters: a viscosity of about 60–150 poises, an yield value of about 1000–3000 dynes/cm$^2$, and a tack of about 3.5–7.5 (1 min. 1200 rpm inkometer, 90° F.). The viscosity and yield value are obtained at 25° C. on a Brookfield Viscometer Model HP using a CP-52 spindle and the Bingham Law Program, wherein the starting shear rate is 5 sec$^{-1}$, the end shear rate is 35 sec$^{-1}$, the step shear rate is 5 sec$^{-1}$, and the step interval is 30 seconds.

The present invention provides a printing ink comprising a colorant having a particle size of from about 0.01 μm to about 25 μm, a vegetable oil, an oil modified polyamide, and a film forming polymer having both hydrophilic and hydrophobic groups.

The present invention provides a printing ink comprising a naphthenic oil, a colorant having a particle size of from about 0.01 μm to about 25 μm, a hydrocarbon resin, and a polyester-oil polymer.

The present invention provides an ink concentrate suitable for preparing a printing ink, the ink concentrate comprising a colorant having a particle size of from about 0.01 μm to about 25 μm, a hydrocarbon resin, and a binder resin selected from the group consisting of a polyamide-oil polymer and a polyester-oil polymer. It is believed that the colorant particle is coated or surface modified by the other ingredients of the ink concentrate.

The present invention further provides a printing ink comprising a film forming polymer comprising both hydrophilic and hydrophobic groups and an ink concentrate comprising a colorant having a particle size of from about 0.01 μm to about 25 μm, a hydrocarbon resin, and a polyamide-oil polymer binder resin.

The present invention further provides a printing ink comprising a naphthenic oil and an ink concentrate comprising a colorant having a particle size of from about 0.01 μm to about 25 μm, a hydrocarbon resin, and a polyester-oil polymer binder resin.

The printing ink of the instant invention can be prepared by any suitable method. For instance, all the ingredients can be suitably mixed in a mixer until an ink of uniform consistency is obtained. In a preferred method of preparation of the ink, an ink concentrate is first prepared and the ink concentrate is used to prepare the inventive ink.

A detailed description of each of the ingredients suitable for the preparation of the ink concentrate and the ink is set forth below.

Colorant

Any suitable colorant can be used to prepare the ink and the concentrate of the present invention. The colorant may be a dye or a pigment. The colorant may be organic or inorganic. Examples of colorants include Metallized Azo Reds such as Red 49:1 (Barium salt), Red 49:2 (Calcium salt), Red 63:1 (Calcium salt), Toluidine Reds, Naphthol Reds, Pyrazalones, Rhodamines, Quinacridones such as Red B, Red Y, Magenta B, Magenta and Violet, Phthalocyanine Blues, Phthalocyanine Greens, Carbazole Yellow, Monoarylide Yellow, Diarylide Yellow, Chrome Yellow, Red Lake C, Lithol Reds such as calcium and barium salts, Lithol Rubine, Bon Maroon, Perylene pigments, Red 2B pigments including the calcium, barium and magnesium salts, Chrome yellow, Chrome Orange, Molybdate Orange, Lead Chromes, Lead Silicochromates, Zinc Chromes, barium chromate, strontium chromate, titanium nickel yellow, Liminites, Haematite, Magnetite, Micaceous Oxides of Iron, Siderite, Iron Pyrites, Ferrite Yellow, Red Oxide, Prussian Blue, Orange 36, Diarylide Orange, Dianisidine Orange, Tolyl Orange, and Dinitraniline Orange. Carbon black colorant includes Channel black, furnace black, and lamp black. Carbon black is a preferred colorant for use in newsprinting inks of the instant invention.

Such colorants can have a wide range of particle sizes as from about 0.01 $\mu$m to about 25 $\mu$m, preferably from about 0.02 $\mu$m to about 0.5 $\mu$m, and more preferably from about 0.02 $\mu$m to about 0.03 $\mu$m. Particularly, carbon black colorant can have a particle size of from about 0.01 $\mu$m to about 0.1 $\mu$m, preferably from about 0.02 $\mu$m to about 0.08 $\mu$m, and more preferably from about 0.02 $\mu$m to about 0.05 $\mu$m.

Carbon black can have any suitable surface area, for example, a BET surface area of from about 20 to 300 m$^2$/gm, and preferably a BET surface area of from about 50 to about 100 m$^2$/gm. Examples of carbon black that are commercially available include PRINTEX™ brand carbon blacks and PANTHER™. For instance, PRINTEX 300, PRINTEX 30, PRINTEX 3, PRINTEX A, PRINTEX G, PRINTEX 55, PRINTEX 40, PRINTEX 60, and PRINTEX 200 are examples of suitable commercially available carbon blacks available from Degussa Corp. in Ridgefield Park, New Jersey. MONARCH 120, MONARCH 280, ELFTEX Pellets 115, ELFTEX 5 and ELFTEX 8 are examples of suitable commercially available carbon blacks available from Cabot Corporation, in Billerica, Massachusetts. PRINTEX 300, a preferred carbon black, is a furnace black having a particle size of 0.027 $\mu$m, a BET surface area of 80 m$^2$/gm, and a DBP oil absorption of 65 ml/100 gm. PANTHER brand carbon black is available from Engineered Carbons, Inc. in Borger, Texas. PANTHER 17 is another preferred carbon black, and has a particle size of 0.026 $\mu$m, a BET surface area of 77 m$^2$/gm, and a DBP oil absorption of 71 ml/100 gm.

It is to be noted that the particle size of colorants given above are the primary particle size. It is known in the art that the primary particles tend to aggregate into small clusters known as aggregates. It also is known in the art that these aggregates further agglomerate into larger clusters. Thus, colorants, particularly those that have been converted to a pellet or bead form, contain agglomerates. See, e.g., R. Vash, Ch. 14: "Wetting and Dispersing" in *Handbook of Coating Additives*, and W. Kurtz, "Aspects of Pigment Processing" in *American Ink Maker*, p. 21 et seq. (June 1987).

In order to obtain good dispersion of the colorant in the ink vehicle and good color strength, the colorant is suitably treated so as to break down these aggregates and agglomerates. The colorant can be broken down by any suitable means known to those of ordinary skill in the art, such as a grinder or a sand or ball mill to a particle size suitable for incorporating in the ink or the concentrate. The residence times required to break down the agglomerates and aggregates varies with the type of treatment. Ball milling could take up to 48–96 hours, and more commonly up to 8–12 hours, depending on the degree of dispersion desired. The colorant can be more advantageously treated in a processor such as the Teledyne Readco Continuous Processor (discussed in greater detail later), wherein colorant pellets or beads can be broken down to sub-micron sizes with short residence times, for example, residence times as low as a few minutes.

The colorant may be present in the ink concentrate in an amount of from about 20% to about 50% by weight of the ink concentrate, preferably in an amount of about 25% to about 45% by weight, and more preferably in an amount of from about 30% by weight to about 40% by weight of the ink concentrate. Excessive use of the colorant may lead to poor dispersion, resulting in poor quality images such as blurred images.

Drying Oil

The ink and the ink concentrate preferably comprise a drying oil which is capable of forming a film or coating on the colorant. The drying oil is particularly preferred when an oil modified polyamide is used as the binder resin. The drying oil may be a natural oil or a synthetic oil. A preferred natural oil is a vegetable oil. Vegetable oils obtained from ground nut, cashew nut, castor, chia, corn (maize), cotton seed, hemp, linseed, lumbang, niger seed, oiticia, perilla, poppy, po-yok, safflower, soya, stillingia, sunflower, tobacco seed, tung, and walnut may be suitable for use in the present invention. Common derivatives of such oils, such as partially hydrogenated oils or esters of these oils, may also be used. Dehydrated vegetable oils such as dehydrated castor oil may also be used.

It is known to those of ordinary skill in the art that the aforesaid vegetable oils contain both saturated fatty acids such as stearic acid and palmitic acid, and unsaturated fatty acids. Unsaturated fatty acids present in the vegetable oils include linolenic acid, linoleic acid, oleic acid, and ricinoleic acid. It is preferable that the vegetable oil has an unsaturated fatty acid content of from about 20% by weight of the vegetable oil to about 100% by weight of the vegetable oil, and more preferable that the vegetable oil has an unsaturated fatty acid content of from about 50% by weight of the vegetable oil to about 100% by weight of the vegetable oil. A preferred vegetable oil is soya oil. A fully refined 100% soybean salad oil available from Ashland Chemical Co. is a suitable soya oil. The soya oil has an iodine number of 125–140, and has the following fatty acid content: palmitic acid, 10.3%, stearic acid, 3.6%, oleic acid, 22.7%, linoleic acid, 54.9%, and linolenic acid, 8.1%, by weight. It is to be understood that iodine number is a measure of the degree of unsaturation present in the oil.

Any suitable amount of the drying oil can be used, preferably in an amount of from about 10% by weight to about 40% by weight of the ink concentrate, more preferably in an amount of from about 15% by weight to about 30% by weight of the ink concentrate, and even more preferably in an amount of from about 18% by weight to about 22% by weight.

Hydrocarbon Resin

The ink and the ink concentrate may preferably comprise a hydrocarbon resin. Any suitable hydrocarbon resin may be used, preferably a hydrocarbon resin that serves to wet the colorant and helps in forming a good coating around the colorant along with the binder resin.

The hydrocarbon resin may be natural or synthetic, and aliphatic or aromatic. It is preferred that the hydrocarbon resin is oil soluble, and has a softening or melting temperature in the range of from about 100° C. to 210° C., and more preferably in the range of from about 100° C. to about 180° C. Examples of suitable natural hydrocarbon resins include bituminous materials. Bitumens are obtained from natural sources in which they often occur in association with mineral matter or as residues from the distillation of crude petroleum oils. Bitumen occurs in admixture with mineral matter, the proportion of which varies from one another. It is preferred that the mineral content is low, preferably below about 1% by weight, and the softening or melting temperature is in the range of 135° C. to about 205° C. Gilsonite is a class of preferred bitumen. Gilsonite resins are relatively high melting (135° to 205° C.) natural hydrocarbon resins found in the Uintah Basin of eastern Utah. Preferred Gilsonite resins are commercially available from Ziegler Chemical & Mineral Corporation in Jericho, New York, under the trade names of ZECO™ 11A, ZECO 11 LMP, and ZECO JET. A more preferred Gilsonite resin is ZECO 11A, which is a brown powder having a Ring and Ball softening point of 149–157° C., a specific gravity of 1.04–1.10 g/cc, a bright lustre, a conchoidal structure, a fixed carbon content of 10–15%, a sulfur content of 0.3%, a moisture content of 0.5%, and an ash content of 0.5% . ZECO 11 LMP is a brown powder having a Ring and Ball softening point of 129–146° C., a specific gravity of 1.05–1.10 g/cc, a bright lustre, a conchoidal structure, a fixed carbon content of 10–15%, a sulfur content of 0%, and an ash content of 0.5%. ZECO JET is a dark brown powder having a Ring and Ball softening point of 166–177° C., a specific gravity of 1.05–1.10 g/cc, a brigth lustre, a conchoidal structure, a fixed carbon content of 10–15%, a sulfur content of 0.3%, a moisture content of 0.5%, and an ash content of 0.5%. The percentages expressed above are by weight.

Examples of other suitable hydrocarbon resins include the asphaltic petroleum resin, PIONEER™ 442, available from PIONEER Asphalt Corporation in Lawrenceville, Illinois. PIONEER 442 has a ring and ball softening point of about 151–157° C. and a specific gravity of 0.999–1.05 g/cc.

Examples of other suitable synthetic hydrocarbon resins include RESINAL™ brand hydrocarbon resins such as the aliphatic hydrocarbon resins and aromatic hydrocarbon resins, available from RESINALL Corporation in Stamford, Conn. RESINALL 760, 762, 764, 766, 767, 768, and 792, are examples of aliphatic hydrocarbon resins, whose melting points are respectively, 100, 120, 140, 105, 105, 105, and 100° C. The Gardner viscosities (70% solution in toluene, line-to-line) of the aforesaid aliphatic hydrocarbon resins are respectively, 5, 14, 22, 5, 6, 6, and 7 seconds. The iodine numbers of the aforesaid resins are respectively, 130, 145, 150, 120, 170, 115, and 130.

Examples of suitable aromatic hydrocarbon resins also include RESINALL 700, 702, 709, 711, 725, 771, and 784, whose melting points are respectively, 100, 120, 140, 100, 100, 110, and 140° C. The Gardner viscosities (70% solution in toluene for 700, 702, 709, and 711, and 50% solution in Magiesol 47 for 771 and 784, line-to-line) of the aforesaid aromatic hydrocarbon resins are respectively, 4, 12, 30, 4, 4, 4, and 15 seconds. The iodine numbers of the aforesaid resins are respectively, 90, 95, 110, 45, 40, 90, and 90.

Other suitable hydrocarbon resins include BETAPRENE™ brand hydrocarbon resins available from Arizona Chemical Co. in Panama City, Fla. Examples of suitable BETAPRENE resins include BETAPRENE 253 having a softening point of 95–105° C., an acid number of 8–17, and a 50% Magiesol line-to-line viscosity of 1–2 seconds, and BETAPRENE 255, having a softening point of 130–136° C., an acid number of 7–22, and a 50% Magiesol line-to-line viscosity of 1–2 seconds.

The hydrocarbon resin may have suitable modifiers on the resin. For instance, the hydrocarbon resin may be modified by phenols. An example of a phenol modified hydrocarbon resin is LX-2000™ available from Neville Chemical Co. in Pittsburgh, Pennsylvania. LX-2000 is a phenol modified hydrocarbon resin having a softening point of 140° C. (ASTM E-28), acid number of less than 1 (ASTM D-974), a color index (Gardner 60% toluene) of 12 (ASTM D-1544), a specific gravity at 25° C. of 1.090 (ASTM D-71), and a Gardner-Hold viscosity at 25° C. (50 wt. % resin in Magiesol 47 oil) of 5–6 seconds (ASTM D-1545). The phenol content of LX-2000 is held as a trade secret.

The hydrocarbon resin may be present in an amount of from about 5% by weight to about 30% by weight of the ink concentrate, and preferably in an amount of from about 10% by weight to about 25% by weight of the ink concentrate, and more preferably in an amount of about 10% by weight to about 20% by weight. Excessive use of the hydrocarbon resin will adversely affect the color strength of the image and the print quality.

Binder Resin

The ink and the ink concentrate comprise a suitable binder resin that provides a coating on the colorant particles. Any suitable binder resin may be used. The binder resin should be soluble in the oil, and interact with the other components of the ink to produce a durable, tough film on the colorant.

It is preferred that the binder resin possesses certain amount of free carboxyl groups in the molecule. The free carboxyl groups are considered important in providing the desired interaction of the binder resin with the other components of the ink resulting in improved rub off properties. The amount of free carboxyl groups is generally expressed as the acid number. The binder resin can have any suitable acid number. Preferably, the binder resin has an acid number of from about 5 to about 20, more preferably the binder resin has an acid number of from about 7 to about 15, and even more preferably the binder resin has an acid number of from about 8 to about 12.

The binder resin can have any suitable viscosity. It is preferred that the viscosity of the binder resin is in the range of from about 25 seconds to 1000 seconds at 77° F. (Bubble Tube).

The binder resin preferably is a polyamide resin or a polyester resin, and more preferably a modified polyamide resin or a modified polyester resin. Any suitable modifier that imparts oil solubility to the polyamide or polyester can be used.

Any suitable polyamide resin can be used as a binder resin. Polyamide resins can be produced by any suitable means known to those of ordinary skill in the art. For instance, they are produced by the polycondensation of a suitable diamine and a suitable diacid, or by the ring opening reaction of a suitable cyclic lactam. Instead of the cyclic lactam, a linear aminoacid such as aminocaproic acid can also be used. The diamines and diacids can aliphatic or aromatic, the aliphatic diamines and diacids being preferred. Examples of suitable diamines include butanediamine, pentanediamine, hexanediamine, heptanediamine, octanediamine, decanediamine, undecanediamine, and dodecanediamine. Examples of suitable diacids include succinic acid, glutaric acid, adipic acid, pimelic acid, suberic acid, decanedicarboxylic acid, and dodecanedicarboxylic acid. Thus hexanediamine and adipic acid form nylon 66 polyamide. Caprolactam or aminocaproic acid can be used to form nylon 6 polyamide. It is preferred that the polyamide component of the modified polyamide is selected from the group consisting of nylon 6, nylon 66, nylon 610, and nylon 612. It is known to those of ordinary skill in the art that the amide groups of a polyamide can chemically and physically interact with polar groups such as carboxyl and hydroxyl groups. It is believed that the amide groups as well as any free amine and carboxyl groups participate in providing improved interaction with the other ingredients present in the coating or in the ink. The improved interaction provides greater strength to the film formed on the colorant.

Any suitable polyester resin can be used as a binder resin. The polyester resin is preferably a linear polyester resin. It is further preferred that the linear polyester resin is unsaturated. Unsaturated polyester resins can be prepared by any method known to those of ordinary skill in the art. For example, it can be prepared by the condensation polymerization of a glycol such as ethylene glycol, propylene glycol, butylene glycol, bisphenol A, and the like, with an unsaturated acid such as maleic acid, preferably in the form of an anhydride. Saturated diacids or dianhydrides such as phthalic anhydride also can be included along with the maleic acid or anhydride in the preparation.

It is further preferred that the modified polyamide or polyester resin is modified with an unsaturated oil to provide a fast drying film on the colorant, and it is still further preferred that the oil comprises an unsaturated vegetable oil. Examples of oil modified polyamides and polyesters include polyamide-oil and polyester-oil polymers, wherein the oil component is covalently attached to the polyamide and the polyester. Any suitable vegetable oil can be used to modify the polyamide or polyester, including vegetable oils obtained from ground nut, cashew nut, castor, chia, corn (maize), cotton seed, hemp, linseed, lumbang, niger seed, oiticia, perilla, poppy, poyok, safflower, soya, stillingia, sunflower, tobacco seed, tung, and walnut. It is preferable that the oil has been refined to remove any gelatinous materials. For instance, raw linseed oil may be refined by heating slowly when a light gelatinous material separates between 200 and 250° C., and removing the gelatinous material by any conventional separation method including filtration in a filter press. Alternatively, the raw linseed oil may be refined by an acid refining process to remove the gelatinous material. Linseed oil and tung oil are particularly preferred for use in the instant invention, with the linseed oil being further preferred. The acid refined linseed oil, a preferred linseed oil, has a specific gravity of 0.930–0.934, a viscosity of about 40 cps, a refractive index of 1.4810–1.4825, a saponification number of 190–195, and an iodine number of 175–185. Tung oil has a specific gravity of 0.939–0.943, a saponification number of 189–197, a refractive index of 1.519–1.522, and an iodine number of 155–170.

The oil modified polyamide may be prepared by any suitable method. For example, to prepare the polyamide-oil polymer, the modifying oil is mixed with the diamine and the diacid and the polycondensation is allowed to proceed under suitable conditions of temperature and pressure. The fatty acids or fatty esters present in the oil react with the amine as well as the amide groups that form by the reaction of the diacid and diamine, to form the modified polyamide.

Alternatively, the polyamide component can be produced first by reacting the suitable diamine and diacid, and the polyamide thus obtained can be reacted with the modifying oil to produce the oil modified polyamide. The modified polyamide results from the reaction of the fatty acid or ester with the residual amine or amide groups on the polyamide. Similarly, the polyester can be modified by reacting it with an oil such as a fatty acid or fatty ester to produce the oil modified polyester resin, such as a polyester-oil polymer. The oil modified polyester results from the reaction of the fatty acid or ester with the residual hydroxyl groups on the polyester and/or by transesterification.

The oil can be present in the oil modified polyamide in an amount of from about 20% by weight to about 90% by weight of the modified polyamide, and preferably in an amount of about 50% by weight to about 75% by weight of the modified polyamide. The oil can be present in the oil modified polyester in an amount of from about 20% by weight to about 90% by weight of the modified polyester, preferably in an amount of from about 50% by weight to about 75% by weight of the modified polyester, and more preferably in an amount of from about 60% by weight to about 70% by weight of the modified polyester. Excessive amount of the oil modifier will adversely affect printability.

Oil modified polamide binder resins suitable for use in the present invention preferably have a viscosity of from about 240 to about 960 seconds (Bubble Tube), and more preferably a viscosity of from about 300 to about 400 seconds (Bubble Tube). Preferred oil modified polyamides include NYLIN™ and NYPOL™ brand polyamide-oil polymers available from Lawter International, Inc. in Northbrook, Ill. NYLIN #5 is a polyamide-linseed oil polymer. NYLIN #5 has a viscosity @ 77° F. (Bubble Tube) of 300–330 seconds, an acid number of 12, and a color index of 15. Nypol #3 and #7 are polyamide-tung oil polymers. Nypol #3 has a viscosity @ 77° F. (Bubble Tube) of about 70–80 seconds, an acid number of 12, and a color index of 12. Nypol #7 has a viscosity @ 77° F. (Bubble Tube) of about 840–960 seconds, an acid number of 12, and a color index of 12.

Oil modified polyester binder resins suitable for use in the present invention preferably have a viscosity of from about 25 to about 960 seconds (Bubble Tube), and more preferably a viscosity of from about 150 to about 250 seconds (Bubble Tube). Examples of oil modified linear polyesters include the TERLON™ brand linear unsaturated polyester-oil polymers, available from Lawter International, Inc. in Northbrook, Ill. TERLON 1 has a viscosity of 25–30 seconds and an acid number of 8–12. TERLON 3 has a viscosity of 65–70 seconds and an acid number of 8–12. TERLON 5 has a viscosity of 180–220 seconds and an acid number of 8–12. TERLON 7 has a viscosity of 840–960 seconds and an acid number of 8–12. TERLON 5 is a preferred linear unsaturated polyester-linseed oil polymer suitable for use in the present invention.

Any suitable amount of the binder resin may be used, preferably in an amount of from about 5% by weight to about 20% by weight of the ink concentrate, more preferably in an amount of from about 8% by weight to about 18% by weight of the ink concentrate, and even more preferably in an amount of from about 10% by weight to about 15% by weight of the ink concentrate.

Saturated Oil

The ink and the ink concentrate may preferably comprise a saturated oil which serves as a good medium for the other components of the ink and the ink concentrate. The saturated oils are generally free of film forming or polymerizable unsaturated groups. Examples of suitable saturated oils include aromatic, naphthenic, and paraffinic oils. The saturated oil preferably has a viscosity in the range of from about 100 SUS to about 2400 SUS at 100° F., and more preferably in the range of from about 500 SUS to about 2,200 SUS at 100° F. Examples of suitable aromatic oils include FLEXON 340 and FLEXON 391, SUNDEX 790 and SUNDEX 8600T, and TUFFLO 491. A preferred naphthenic oil is TUFFLO 2000, which has a viscosity of 2117 SUS at 100° F., a minimum a flash point of 460° F., a refractive index of 1.5088, and a color index of maximum 2.5. Another preferred naphthenic oil is HYDROCAL II 750, which has a viscosity of 700–725 SUS at 100° F., a minimum flash point of 410° F., a neutralization number of 0.014 mg KOH/gm, a refractive index of 1.4982, and a color index of maximum 3.0. Other examples of suitable naphthenic oils include CIRCOSOL™ 450, 4240, and 5600, SUNTHANE™ 450 and 4240, FLEXON™ 676 and 766, and HYDROCAL II 625, 850, 1200, 1400, 2000, and 2400.

Examples of suitable paraffinic oils include SUNPAR 150, SUNPAR 2280, FLEXON 815, FLEXON 865, TUFFLO 10, TUFFLO 60 and TUFFLO 80. A preferred paraffinic oil is TUFFLO 10, which has a viscosity of 100–110 SUS at 100° F., a minimum flash point of 400° F., refractive index of 1.4721, and a color index of maximum 0.5.

TUFFLO brand oils are available from EMCO Chemical Distributors, Inc., CIRCOSOL, SUNTHANE, SUNPAR, and SUNDEX brand oils are available from Sun Oil Co. HYDROCAL II oils are available from EMCO Chemical Distributors, Inc. in North Chicago, Ill.

Any suitable amount of the saturated oil my be used. The saturated oil, if present, may be present in an amount of up to about 45% by weight of the ink concentrate, preferably in an amount of from about 10% by weight to about 40% by weight of the ink concentrate, and more preferably in an amount of about 15% by weight to about 40% by weight of the ink concentrate.

Adhesion Promoter

The ink and the ink concentrate may preferably comprise an adhesion promoter, particularly when an oil modified polyamide is used as the binder resin. The adhesion promoter assists in the formation of a good coating on the colorant particle, and is any agent that is capable of improving the adhesion of the ingredients of the ink concentrate to the colorant particle, preferably a polymeric material that is dispersible in the oils used to prepare the ink or the ink concentrate. The adhesion promoter in combination with the vegetable oil prevents agglomeration of the colorant particles. It is further preferred that the adhesion promoter is a polymer that has a polar group selected from the group consisting of carboxyl, hydroxyl, keto, and aldehyde groups. It is also preferred that the polymer has some hardness, preferably having a needle penetration parameter of from about 2 mm to about 7 mm, and more preferably in the range of from about 4 mm to about 6 mm. The needle penetration parameter is the distance traveled by the needle into the polymer when pushed with a certain predetermined force according to the ASTM method D1321. The smaller the distance traveled, the harder the polymer.

It is further preferred that the polymer melts below about 150° C., and preferably in the range of from about 100° C. to about 120° C. It is also preferred that the polymer has a low viscosity, and more preferred below about 200 cps at 250° C., and it is most preferred that the viscosity is in the range of from about 10 cps to about 100 cps at 300° F. (ASTM D-3236).

Examples of preferred polymeric adhesion promoters include oxidized polyethylenes such as the LEXON™ brand oxidized polyethylenes from Lexon Industries in Downington, Pa. Examples of more preferred oxidized polyethylene include LEXON 101 and LEXON 102. LEXON 101 has a melting point of about 111° C., a needle penetration parameter of 5 mm, an acid number of 18.2 mg KOH/g, a saponification number of 38.4 mg KOH/g, and a viscosity of 27.5 cps at 300° F. (according to ASTM D3236). LEXON 102 has a melting point of about 108° C., a needle penetration parameter of 5 mm, an acid number of 22.7 mg KOH/g, a saponification number of 42.5 mg KOH/g, and a viscosity of 60 cps at 300° F. LEXON 101 is a still more preferred oxidized polyethylene adhesion promoter.

The exact mechanism by which the adhesion promoter assists in the formation of the coating is not clear. It is believed that the polar groups present on the adhesion promoter such as the oxidized polyethylene may be involved in promoting the adhesion. For instance, the oxygenated groups on oxidized polyethylene may interact with the colorant such as carbon black through the polar groups such as carboxyl or hydroxyl, present on the colorant. The interaction may be through any mechanism, including chemical forces such as the formation of an ionic or covalent bond, and physical forces such as van der Waals interactions such as dipole-dipole interactions and dipole-induced dipole interactions, hydrogen bonding interactions, acid-base interactions, and donor-acceptor interactions. It is also believed that one or more of such interactions may be present among the binder resin, the film forming agent, and the adhesion promoter.

The adhesion promoter is used in the ink or the ink concentrate in an amount sufficient to coat the colorant, preferably the entire colorant. The adhesion promoter is used in an amount of from about 0.5% by weight to about 4% by weight of the ink concentrate, and preferably in an amount of from about 1% by weight to about 3% by weight of the ink concentrate. Excessive use of the adhesion promoter may result in poor runnability and diminished color strength.

Ink Concentrate

The ink concentrate of the present invention may be prepared by using aforesaid ingredients by any suitable method known to those of ordinary skill in the art. A preferred method for the preparation of an ink concentrate comprising an oil modified polyamide as the binder resin is described below. The saturated oil, the drying oil, the hydrocarbon resin, and the binder resin are combined in a suitable mixer such as the HIDROBAT-10™ mixer from Premier Mill Corp., Reading, Pa., and stirred until complete dissolution is obtained. The stirring may be maintained for a period of from about 30 minutes to about one and a half hours, at a temperature of about 155° C. to about 175° C., and preferably for a period of about one hour at about 170° C. The temperature is then reduced to about 120° C. to about 140° C., preferably to about 130° C., and the adhesion promoter is added. The mixing is continued for a period of about 10 minutes to about 20 minutes, preferably for a period of about 15 minutes. The temperature is then reduced to about 90° C. to about 110° C., preferably to about 100° C., and the colorant is added slowly with mixing over a period of about 15 minutes to about 30 minutes, preferably for about 20 minutes. The mixing is continued for a period of about 30 minutes to about 60 minutes, preferably for about 45 minutes, after the addition of the colorant to obtain the ink concentrate.

The ink concentrate also can be prepared by the following alternative method. A first dispersion vehicle comprising a saturated oil, a hydrocarbon resin, a binder resin, and a dispersing agent, and a second dispersion vehicle (or let down vehicle) comprising a saturated oil, a hydrocarbon resin, and a binder resin are first prepared separately. The dispersion vehicle and the let down vehicle are then combined with the desired colorant in a suitable mixer to prepare the ink concentrate.

Any suitable combination of ingredients can be employed to prepare the dispersion vehicle, for example, the dispersion vehicle can comprise a naphthenic oil in an amount of from about 30% by weight to about 65 % by weight and preferably in an amount of from about 40% by weight to about 55% by weight of the vehicle. The hydrocarbon resin can be present in an amount of from about 5% by weight to about 30% by weight and preferably in an amount of from about 10% by weight to about 25% by weight of the vehicle. The dispersion vehicle can comprise a binder resin in an amount of from about 10% by weight to about 30% by weight and preferably in an amount of from about 15% by weight to about 25% by weight of the dispersion vehicle. The dispersion vehicle also can comprise a dispersing agent such as a blown castor oil in an amount of from about 2% by weight to about 15% by weight and preferably in an amount of from about 4% by weight to about 10% by weight of the dispersion vehicle.

An example of a suitable mixer is the 5 inch model 40 HP Teledyne Specialty Equipment Readco Products Co. (York, PA) Continuous Processor described in copending U.S. patent application Ser. No. 08/267,039, filed Jun. 27, 1994.

Certain embodiments of the ink concentrate as well as the printing ink of the present invention can be prepared using the apparatus shown in FIG. 1.

As shown in FIG. 1, the dispersion vehicle is taken in vessel 101. Fluid from vessel 101 is fed to the inline mixer 120 by pump 102 through the flow meter 103. The flow meter 103 measures the flow rate of the fluid from vessel 101 to the inline mixer.

Hopper 130 is in communication with the inline mixer 120. The colorant is fed from the hopper to the inline mixer. The flow rate of the colorant is measured by the loss of weight or loss of volume, and through appropriate control means (not shown) the flow to the inline mixer is controlled.

Optionally, a second dispersion vehicle (also referred to sometimes as let down vehicle) can be fed from vessel 110 by means of the pump 111 to the inline mixer. The flow rate of the second dispersion vehicle can be measured using flow meter 112. The dispersion vehicle and the colorant particles are mixed and ground within the inline mixer in the first mixing and grinding region 125 to obtain a dispersion. The high shear imparted by the first region helps in breaking down the particle size of the colorant particles or pellets. Thus, for example, when pellets of carbon black are employed, the pellets are ground into fine particles in the first region. The inline mixer is driven by the motor 140. The inline mixer is cooled by any suitable cooling means, including by circulating tap water or chilled water.

The dispersion then passes internally in the inline mixer to a second mixing region 126. In the second mixing region the dispersion is optionally combined with a second dispersion vehicle and the mixing and grinding are continued. The resulting product, the ink concentrate or the ink, is collected in receiving tank 150. The temperature of the dispersion is measured by suitable probes 121, 122, and 123, placed along the length of the inline mixer. The flow rates of the dispersion vehicles and the colorant are controlled so as to obtain a residence time in the inline mixer suitable for producing a uniform dispersion. By proper choice of the composition of the dispersion vehicles, the apparatus can be used to prepare either an ink concentrate or a printing ink itself.

Any suitable inline mixer can be used, particularly one that produces high shear mixing and allows the fluid being mixed to be translated from a region of high shear to a region of low shear. An example of a suitable inline mixer is the Teledyne Readco Continuous Processor. The Processor has a twin screw design, providing co-rotating shafts, with close clearances between the paddles themselves and between each of the paddles and the inside wall of the processor. A transverse-section of the interior of the processor is shown in FIG. 2 and a cross-section is shown in FIG. 3.

The Teledyne Readco Continuous Processor is made, in general, in accordance with U.S. Pat. Nos. 3,490,750 and 3,618,902. The clearance between the two rotating paddles and between each of the paddles and the interior chamber wall is, however, approximately the same. That clearance is typically in the range of from about 0.030 inches to about 0.080 inches. In operation, the Processor exerts a high shear on any fluid being processed in the Processor, while concurrently and continuously extruding that fluid. Such action is achieved by distributive mixing, caused by the fluid in the mixer being continuously forced from regions of high shear to regions of low shear, developed by the interrelationship between the rotating paddles in the Processor, while at the same time providing areas of minimal clearance through which the fluid in the processor must flow, to pass from such regions of high shear to the regions of low shear. The fluid passing through these areas of minimal clearance have great shear imparted thereto. These interrelated phenomena are described in more detail in the aforementioned U.S. Pat. Nos. 3,490,750 and 3,618,902.

Figure 2:
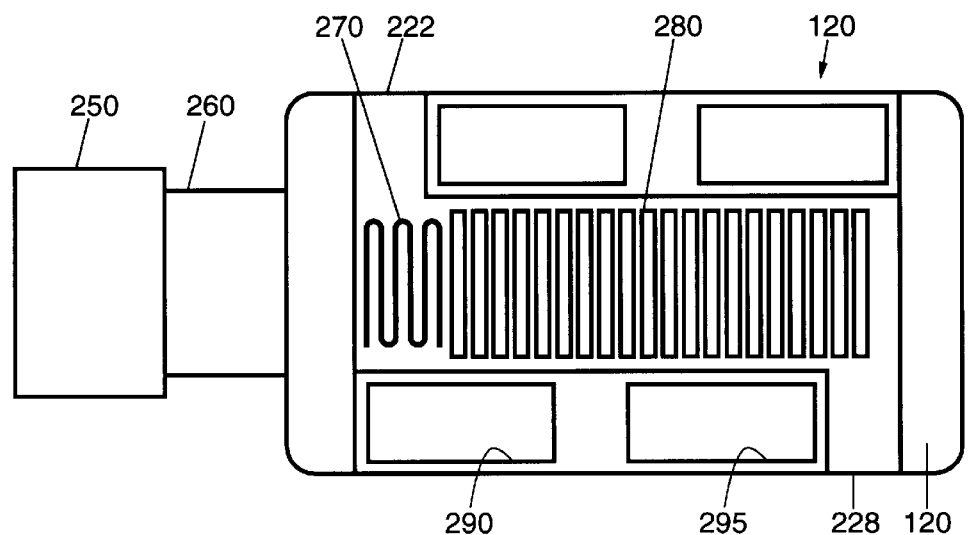
FIG. 2 depicts a transverse cross-section of the inline mixer used to prepare an ink concentrate and a printing ink of the present invention.

In FIG. 2, the inline mixer 120 is shown with the associated electric motor 250 and transmission 260, which is connected to the auger 270 and cams 280. Material is introduced through input port 222 and exits through exit port 228. Cooling chamber 290 provides a means for cooling the first region and cooling chamber 295 provides a means for cooling the second region. Inlet ports (not shown) are provided along the length of the mixer.

Figure 3:
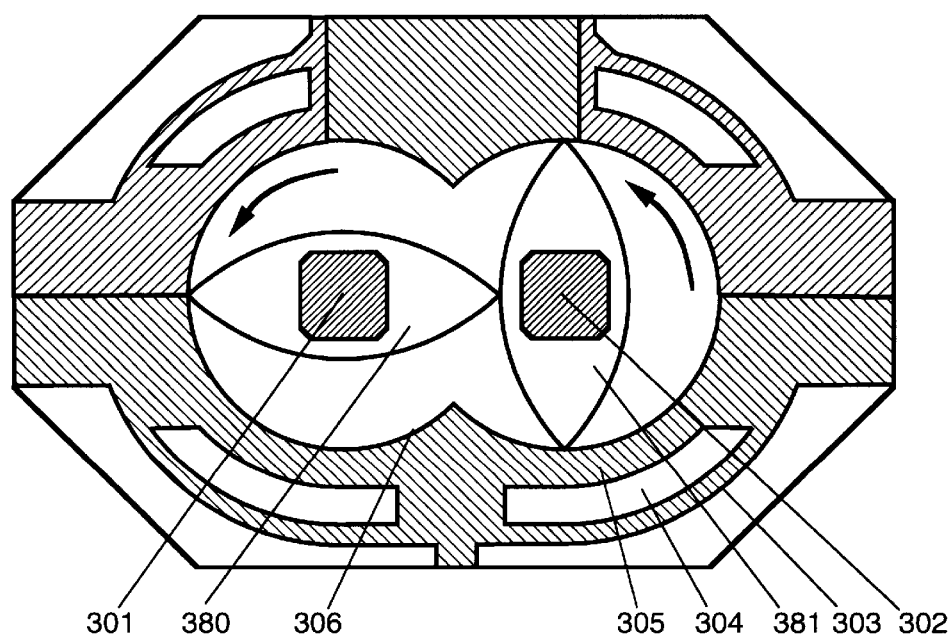
FIG. 3 depicts a cross-section of a portion of the inline mixer used to prepare an ink concentrate and a printing ink of present invention.

In FIG. 3, the configuration of the co-rotating shafts 301 and 302 are shown, with the attached cams 380 and 381. The outside jacket wall 303 with the inside jacket wall 305 form an interstitial space 304 in which a cooling fluid can circulate. Inside vessel wall 306 forms a close clearance with cams 380 and 381. By carefully choosing the configuration of the cams in the first and second regions, the shear exerted on the fluid in the different regions can be suitably varied.

In operation, pressure may be applied to the feed side of the fluid in the Processor to increase the throughput, if desired. Alternatively, vacuum may be used at the product side of the Processor, also to increase throughput. The use of vacuum can also allow the Processor to be operated at a lower temperature, which may be desirable if unstable particles are to be dispersed, such as organic pigments.

Any suitable amount of the ink concentrate can be used to prepare the present inventive ink. The ink concentrate is used preferably in an amount of from about 30% by weight to about 70% by weight, more preferably in an amount of from about 40% by weight to about 65% by weight of the ink, and even more preferably in an amount of from about 50% by weight to about 65% by weight of the ink. Excessive use of the ink concentrate will adversely affect the image quality, for instance the image resolution will decrease and image set-off will increase.

An embodiment of the non-rub off ink comprising an oil modified polyamide binder resin can be prepared by combining the ink concentrate with suitable ingredients, such as suitable oils, a suitable surface active agent, and a suitable film forming component. The ink is prepared by mixing the aforesaid ingredients in a suitable blender or mixer.

Another embodiment of the inventive ink, especially one comprising an oil modified polyester binder resin, can be prepared by combining and mixing a dispersion vehicle, a let down vehicle, and a colorant in a suitable mixer. A detailed discussion of the additional ingredients of the inventive newsprint ink and a method of preparation of the ink are set forth below.

Oils Used to Prepare the Invention Ink

The inventive ink can be based on any suitable medium including oil, water, and solvent, oil being preferred. Any suitable oil or combination of oils can be used in the preparation of the inventive ink. The oil preferably is able to disperse the components of the ink, evaporate rapidly or be absorbed rapidly in the paper, so as to allow rapid film formation on the colorant.

Saturated oils are preferred for use in the present invention. Any suitable saturated oil can be used. Preferably the viscosity of the saturated oil is in the range of from about 30 SUS to about 2500 SUS at 100° F. It is further preferred that the saturated oil has a low aromatic content, preferably below about 45% by volume. It is further preferred that the saturated oil has a high saturates content, preferably above about 50% by volume, and more preferably in the range of from about 50% by volume to about 90% by volume, and even more preferably in the range of from about 55% by volume to about 88% by volume. It is to be understood that saturates include paraffinic and naphthenic components.

Examples of preferred saturated oils suitable for use in the instant invention include Mineral Seal Oil and TUFFLO brand oils, including TUFFLO 10, 15, 20, 25, 300, 750, 1000, 1200, and 2000. A TUFFLO oil is preferred if a zero-VOC version of the ink is desired.

TUFFLO 10 has a molecular weight of 361, a refractive index of 1.4721, a viscosity of 107 SUS @ 100° F., a saturates content of 86.1% by volume, and an aromatics content of 13.7% by volume. The refractive index values given herein are at 20° C. TUFFLO 15 has a molecular weight of 398, a refractive index of 1.4752, a viscosity of 155 SUS @ 100° F., a saturates content of 84.9% by volume, and an aromatics content of 14.9% by volume. TUFFLO 20 has a molecular weight of 428, a refractive index of 1.4770, a viscosity of 202 SUS @ 100° F., a saturates content of 82.5% by volume, and an aromatics content of 17.2% by volume. TUFFLO 25 has a molecular weight of 450, a refractive index of 1.4790, a viscosity of 250 SUS @ 100° F., a saturates content of 83.7% by volume, and an aromatics content of 16.0% by volume.

TUFFLO 300 has a molecular weight of 352, a refractive index of 1.5015, a viscosity of 300 SUS @ 100° F., a saturates content of 59.4% by volume, and an aromatics content of 40.1% by volume. TUFFLO 750 has a molecular weight of 382, a refractive index of 1.5098, a viscosity of 745 SUS @ 100° F., a saturates content of 57.1% by volume, and an aromatics content of 41.5% by volume. TUFFLO 1200 has a molecular weight of 427, a refractive index of 1.5104, a viscosity of 202 SUS @ 100° F., a saturates content of 55.9% by volume, and an aromatics content of 42.5% by volume. TUFFLO 2000 has a molecular weight of 447, a refractive index of 1.5088, a viscosity of 2117 SUS @ 100° F., a saturates content of 58.9% by volume, and an aromatics content of 39.2% by volume.

Mineral Seal Oil, available from EMCO Chemical Distributors, Inc., is another preferred oil. It is a paraffinic oil having a molecular weight of 237, and has a boiling point of 250° C., a saturates content of 85.1% by volume, and an aromatics content of 14.9% by volume, a refractive index of 1.4524, an acid number of 0.01 and a viscosity of 3.53 CST @ 104° F. (about 37–38 SUS @ 100° F.). If Mineral Seal Oil is used, a non-zero VOC version of the ink will be produced.

HYDROCAL™ 300, available from Calumet Lubricants Co. in Princeton, La., is yet another preferred saturated oil. HYDROCAL 300 is a naphthenic oil having a viscosity of 300–315 SUS @ 100° F., a flash point of 360° F., a pour point of −35° F., and an API gravity (ASTM D287) of 25.0.

Another class of preferred oils include tall oil fatty acid (TOFA) esters. Examples of suitable tall oil fatty acid esters include those produced by the esterification of tall oil fatty acid with $C_1$–$C_8$ alkyl alcohols or $C_2$–$C_6$ alkylene glycols. Esterification can be carried out by any suitable means known to those of ordinary skill in the art, for instance, by heating required quantities of the alcohol and the tall oil fatty acid together in the presence of a suitable catalyst such as sulfuric acid. Several such tall oil fatty acid esters are commercially available. For example, NIREZ™ brand tall oil fatty acid esters are available from Arizona Chemical Company Co. in Panama City, Fla. Suitable NIREZ brand tall oil fatty acid esters include NIREZ 9011, which is a methyl ester of tall oil fatty acid and has a Brookfield viscosity of 7 centipoises, an acid number of 5, an iodine value of 105, and a EPA-24 volatiles content of 8%, NIREZ 9012, which is a butyl ester of tall oil fatty acid and has a Brookfield viscosity of 7 cps, an acid number of 2, an iodine value of 110, and a EPA-24 volatiles content of 2%, NIREZ 9015, which is a butyl ester of tall oil fatty acid and has a Brookfield viscosity of 8 cps, an acid number of 14, an iodine value of 112, and a EPA-24 volatiles content of 2% NIREZ 9007, which is a 2-ethylhexyl ester of tall oil fatty acid and has a Brookfield viscosity of 14 cps, an acid number of less than 1, an iodine value of 97, and a EPA-24 volatiles content of less than 1%, NIREZ 9017, which is a diethylene glycol ester of tall oil fatty acid and has a Brookfield viscosity of 37 cps, an acid number of 8, an iodine value of 110, and a EPA-24 volatiles content of less than 1t, NIREZ 9014, which is a methyl ester of tall oil fatty acid and has a Brookfield viscosity of 15 cps, an acid number of 5, an iodine value of 73, and a EPA-24 volatiles content of 8%. NIREZ 9012 is a preferred tall oil fatty acid ester.

The suitable oil or the combination of suitable oils may be used in any suitable amount, preferably in an amount of from about 30% by weight to about 70% by weight of the ink, and more preferably in an amount of from about 40% by weight to about 65% by weight of the ink. Excessive amount of oil is to be avoided because excess oil will reduce the viscosity and yield value of the ink thereby affecting water tolerance and printability.

The saturated oil also may be a part of the ink concentrate, particularly when an oil modified polyester binder resin is employed. Thus, the saturated oil can be present in an amount of from about 30% by weight to about 50% by weight of the concentrate and preferably in an amount of from about 30% by weight to about 40% by weight of the concentrate.

Surface Active Agent

The ink of the present invention may preferably comprise a suitable surface active agent to facilitate and stabilize the ink. The surface active agent may also reduce the surface tension energy of the oils, thereby increasing the drying rate of the ink. Any suitable surface active agent can be used, including anionic, cationic, nonionic, amphoteric surface active agents, and combinations thereof. Nonionic surface active agents are preferred. Nonionic surface active agents having hydroxyl and ester groups are further preferred. Thus it is preferred to use a surface active agent having a hydroxyl number of from about 20 to about 100 mg KOH/g, and more preferable to use a surface active agent having a hydroxyl number of from about 40 to about 80 mg KOH/g. It is also preferable to use a surface active agent having a saponification number of from about 100 to about 250 mg KOH/g, and more preferable to use a surface active agent having a saponification number of from about 150 to about 200 mg KOH/g. It is also preferred that the Hydrophile-Lipophile Balance (HLB) number of the surface active agent is in the range of from about 1 to about 5. Examples of suitable nonionic surface active agents include fatty acid esters of sorbitan such as sorbitan monooleate, sorbitan monopalmitate, sorbitan monostearate, sorbitan distearate, sorbitan tristearate, sorbitan sesquioleate, sorbitan trioleate, sorbitan monolaurate, sorbitan dilaurate, sorbitan trilaurate, and fatty acid triglycerides such as oleic acid monoglyceride, oleic acid diglyceride, polyethylene oxide adducts of fatty acids such as polyoxyethylene monolaurate, polyoxyethylene monostearate, polyoxyethylene monooleate, and ethylene oxide adducts of alkyl phenols and higher alcohols. Several of the surface active agents are available from common chemicals suppliers including Aldrich Chemical Co. in Milwaukee, Wis. Sorbitan monooleate and sorbitan trioleate are more preferred surface active agents, also available from ICI Surfactants, in Wilmington, Del., as SPAN™ 80 and 85, respectively. SPAN 85 has a hydroxyl number of 55–70 mg KOH/g, a saponification number of 170–190 mg KOH/g, a viscosity of about 210 cps at 25° C., and a HLB number of 1.8.

Any suitable amount of the surface active agent is used. The surface active agent is used in the ink in an amount of from about 0.05% by weight to about 1% by weight of the ink, and preferably in an amount of from about 0.1% by weight to about 0.5% by weight of the ink. Excessive use of the surface active agent is to be avoided because the excess surface active agent will diffuse through the paper and make it transparent and destabilize the ink.

Film Forming Component

The ink of the instant invention, particularly one wherein an oil modified polyamide binder resin is employed, may comprise a film forming component which forms a film rapidly and secures the colorant particles to the paper. Any suitable film forming component can be used. It is preferred that the film formed on the colorant forms rapidly, and more preferred that the film forms under 7 minutes, and even more preferred that the film form in a period of from about 3 minutes to about 5 minutes, under the conditions of printing and drying.

The film forming component is preferably a polymer, and more preferably, a polymer having functional groups or segments capable of interacting with the amide and carboxyl groups of the binder resin as well as the functional groups on the surface of colorants. It is preferred that the polymer bears hydrophilic groups such as carboxyl or hydroxyl groups. Examples of hydrophilic groups or segments include polymerized acrylic acid, methacrylic acid, hydroxyethylacrylic acid, hydroxyethylmethacrylic acid, hydroxymethylacrylate, hydroxyethylacrylate, hydroxyethyl methacrylate, ethylene oxide, hydrolyzed vinylacetate, and the like.

It is also preferred that the film formed on the surface of the colorant is water resistant. Therefore, it is further preferred that the polymer also has groups or segments which are hydrophobic. Examples of hydrophobic segments include polymerized ethylene, propylene, butylene, styrene, halogenated olefins such as tetrafluoroethylene, chlorotrifluoroethylene, acrylates of alcohols having about 1–20 carbon atoms, and the like. Thus it is most preferred that the polymer comprises both hydrophilic and hydrophobic groups or segments.

It is also preferred that the polymer has sufficiently high molecular weight so that it is able to, either by itself or in combination with the other ingredients of the ink, and more particularly with the binder resin, a tough, durable film on the colorant when the ink is dried on the paper. It is preferred that the number average molecular weight is at least above 5,000, and preferably in the range of from about 500,000 to about 1,000,000.

Suitable polymers that can be used in the instant invention include water dispersible polymers. Examples of water dispersible polymers that can be used in the instant invention include styrene-acrylic copolymers, styrene-maleic anhydride copolymers, shellac based acrylic resins, and polyester resins.

Water dispersible styrene-acrylic copolymers that are useful in the instant invention can be made by copolymerizing a suitable styrene monomer with a suitable acrylic monomer. Examples of acrylic monomers that can be used in the practice of the instant invention include acrylic acid, methacrylic acid, ethylacrylic acid, propylacrylic acid, ethyl methacrylic acid, propyl methacrylic acid, and the like. The acrylic monomer can also be in the form of a carboxylate salt with a suitable cation including sodium, potassium, and ammonium, or in the form of an amide such as acrylamide or methacrylamide. Suitable comonomers may be included in the styrene-acrylic polymer. Examples of comonomers include methyl acrylate, ethyl acrylate, propyl acrylate, butyl acrylate, methyl methacrylate, ethyl methacrylate, propyl methacrylate, butyl methacrylate, hydroxyethyl acrylate, hydroxypropyl acrylate, hydroxybutyl acrylate, hydroxyethyl methacrylate, hydroxypropyl methacrylate, hydroxybutyl methacrylate, and the like, and combinations thereof.

The suitable styrene monomer may be unsubstituted, or a substituted styrene such as a-methylstyrene, o, p, and m-chloromethyl styrene, styrene substituted with fluoro, chloro, bromo, iodo, nitro, or amino group. Unsubstituted styrene is a preferred styrene monomer.

Suitable copolymers can be prepared by any known methods. For instance, a copolymer emulsion of styrene and acrylic acid can be prepared by polymerizing in the emulsion state the suitable monomers using a suitable catalyst. Examples of catalysts include redox catalysts such as ammonium persulfate-ferrous sulfate, Fenton's reagent (ferrous sulfate-hydrogen peroxide), acyl peroxides such as benzoyl peroxide in combination with a reducing agent such as N,N-dimethylaniline, potassium perbromate-ferrous sulfate, potassium permanganate-ferrous sulfate, and the like.

In another method of preparing the copolymer, a mixture of styrene and an acrylic monomer such as methylacrylate or acrylamide can be polymerized using a suitable catalyst, for instance, a free radical initiator such as 2,2'-azobisisobutyronitrile, benzoyl peroxide, or dicumyl peroxide. The copolymer is then hydrolyzed by suitable methods such as by using an acid or alkali to liberate the free carboxyl groups. The resulting styrene-acrylic acid copolymer can be emulsified by any of the known methods of emulsification. For instance, the copolymer may be dissolved in an organic solvent, and the solution then dropped into water with good stirring. Alternatively, an aqueous mixture of the copolymer particles may be treated to enhance the solubility or dispersibility of the copolymer in water, for instance, the aqueous mixture may be treated with a base such as ammonium hydroxide until a finely dispersed emulsion is obtained. The carboxyl group of the acrylic acid may be present in the copolymer as the free acid or the salt of a cation such as ammonium, sodium, or potassium.

It is believed that the styrene-acrylic acid copolymer interacts with the binder resin to form a rapidly forming film that is durable and tough. The durability and toughness of the film is believed to result also from the interaction among the functional groups on the copolymer and the binder resin.

It is also preferred that the styrene-acrylic acid copolymer comprises acrylic acid in an amount of from about 5 mole % to about 50% mole % of the copolymer, and more preferably in an amount of from about 10 mole % to about 40% mole% of the copolymer. The copolymer preferably has an acid number in the range of from about 10 to about 100, and preferably in the range of from about 30 to about 70. Excessive amounts of the acrylic acid or very high acid number will decrease the water resistance of the film formed on the colorant.

Several water dispersible styrene-acrylic copolymers are commercially available and can be used in the instant invention. Water dispersible styrene-acrylic copolymers can also be obtained from S. C. Johnson & Co. in Racine, Wis., which sells the acrylics under the trade name of JONCRYL. Examples of JONCRYL acrylics are the JONCRYL 555, 586, 678, 680, 682, 683, and 67, which are water solubilized copolymers of styrene, alpha methylstyrene, and acrylic acid. Other examples include the styrene-acrylic acid copolymers, JONCRYL 538 and 138.

Water dispersible styrene-acrylic acid copolymers can also be obtained from B. F. Goodrich Co. in Akron, Ohio, with the preferred acrylic being CARBOSET GA-1086. CARBOSET GA-1086 is a translucent emulsion having a solids content of 49%, a Ph of 8.6, and a Brookfield viscosity of 800 cps at 25° C. The solids present in the emulsion have an acid number of 50.

It is believed that the interaction may be through any known mechanism, including chemical forces such as the formation of a covalent bond, and physical forces such as van der Waals interactions such as dipole-dipole interactions and dipole-induced dipole interactions, hydrogen bonding interactions, acid-base interactions, and donor-acceptor interactions. It is also believed that one or more of such interactions may be present among the binder resin, the film forming component, and the adhesion promoter.

The film forming component can be present in the ink in an amount sufficient to provide good adhesion of the ink to the paper as well as the non-rub off characteristic. The film forming component (active ingredient) is present in the ink in an amount from about 1% by weight to about 10% by weight, and preferably in an amount of from about 2% by weight to about 5% percent by weight of the ink. Excessive use of the film forming component may adversely affect the water repellency of the ink.

Rheological Additive

The ink of the present invention may also comprise a rheological additive to provide optimal viscosity and yield values, or to act as a suspending agent by preventing agglomeration and settling of the colorant, particularly when an oil modified polyamide is used as the binder resin. Any suitable rheological additive effective in controlling colorant agglomeration and settling can be used. Examples of such suitable additives for this purpose are hydrogenated castor oils, clays, and aluminum alcoholates. Clay additives are preferred. Examples of suitable clay additives include kaolinites, illinites, hallosites, montmorillonites, attapulgites, and allophanes. It is further preferred that the clay additive is hydrophobic or moderately hydrophobic. A clay additive that does not require pregelling is more preferred. Thus, a more preferred additive is an organically modified montmorillonite clay. Montmorillonite clay can be organically modified, for instance, by replacing the metal cation, wholly or partially, with a suitable organic cation such as a quaternary ammonium cation. An example of a suitable quaternary ammonium cation is a tetraalkylammonium cation. The organic modification is designed to reduce the hydrophilicity of the clay and therefore to make the clay suitable as a rheological additive in oil based systems such as the newsprinting ink of the instant invention.

An example of a preferred organically modified montmorillonite clay is CLAYTONE HY™, available from Southern Clay Products, Inc. in Gonzales, Tex. CLAYTONE HY is sold as a finely divided powder having specific gravity at 25° C. of 1.6, particle size of −450 mesh (98%), a moisture content of 2%, and a weight loss at 1000° C. of 43%. It has been found that CLAYTONE HY disperses under low shear and no activator is required to obtain good dispersion. CLAYTONE HY also does not require pregelling and can be added directly with other ingredients into the batch prior to dispersion.

Any suitable amount of the rheological additive can be used. The Theological additive is used preferably in an amount of from about 0.05% by weight to about 1% by weight of the ink, and more preferably in an amount of from about 0.1% by weight to about 0.4% by weight of the ink. Excessive use of the rheological additive is to be avoided because the excess will cause an undesirable increase in ink viscosity and yield value.

Water Flight Agent

The ink of the present invention may comprise a water flight agent to prevent the ink from picking up water during use. The water flight agent is a hydrophobic material. Any suitable water flight agent can be used. The viscosity of the water flight agent can be in the range of from about 100 centipoises to about 500 poises. It is preferred that the viscosity of the water flight agent is high. The water flight agent may be a blown castor oil or a special hydrophobic resin. The water flight agent may also act as a dispersing agent in certain situations, for example, during the continuous processing of the ink or the concentrate.

Blown castor oils are oxidized castor oil polymers. The process of oxidation also introduces polar groups on the polymers. Preferred blown castor oils include those having an acid number of from about 10 to about 20, an iodine number of from about 40 to about 80, a Gardner color index of from about 3 to about 18, and a specific gravity of from about 0.90 to about 1.10.

Examples of suitable blown castor oils include the Sud-Chemie Rheologicals' YORK™ brand Blown Castor Oils, available from United Catalysts, Inc. in Louisville, Ky. Examples of suitable York Blown Castor Oils include the Z-1, Z-3, Z-6, and Z-8 viscosity grades. The Z-1 grade oil, has an acid number of 12, an iodine number of 70–75, a Gardner color index of 4–8, and a specific gravity of 0.99. The Z-3 grade oil has an acid number of 13, an iodine number of 70–75, a Gardner color index of 7–11, and a specific gravity of 1.00. The Z-6 grade oil has an acid number of 14, an iodine number of 60–65, a Gardner color index of 9–13, and a specific gravity of 1.01. The Z-8 grade oil has an acid number of 15, an iodine number of 55–60, a Gardner color index of 12–16, and a specific gravity of 1.01.

Examples of preferred hydrophobic resins include AQUAPEL™ 2 and 3, available from Shamrock Technologies, Inc. in Newark, N.J. AQUAPEL 3 is more preferred than AQUAPEL 2 because of its higher viscosity and improved hydrophobic properties. AQUAPEL 3 has a Brookfield viscosity of 400 poises.

The water flight agent may be present in the ink in any suitable amount, and preferably in an amount of from about 0.5% by weight to about 4% by weight of the ink, and more preferably in an amount of from about 1% by weight to about 3% by weight of the ink. Excessive use of the water flight agent is to be avoided because the excess will prevent effective dispersion components of the ink.

In addition to the aforesaid components, the ink of the present invention may comprise other suitable additives such as plasticizers to improve the properties of the film, for instance, to improve the flexibility of the film without impairing other properties. Any suitable plasticizer can be used, preferably those which are non-volatile, compatible with other components of the ink, and chemically stable. It is preferred that the boiling point of the plasticizer is above about 200° C., and more preferably in the range of from about 200° C. to about 420° C.. Examples of suitable plasticizers include esters, terpene based plasticizers, castor oil based placticizers, and chlorinated waxes. Esters constitute a preferred class of plasticizers suitable for the preparation of the ink of the present invention. Examples of suitable esters include, triacetin, dimethyl phthalate, dibutyl phthalate, dioctyl phthalate, tributyl phosphate, tritolyl (tricresyl) phosphate, butyl stearate, dibutyl sebacate, tributyl citrate, and butyl oleate. A preferred ester is 2,2,4-trimethyl-1,3-pentanediol diisobutyrate, which is commercially available from Eastman Kodak Co. as KODAFLEX™ TXIB, and has a boiling point of 280° C., excellent resistance to hydrolysis, and a viscosity of 9 cps at 25° C.

Any suitable amount of the plasticizer may be present in the ink of the present invention, preferably in the range of from about 0.5% by weight to about 3% by weight of the ink, and more preferably in the range of from about 1% by weight to about 2% by weight of the ink. Excessive use of the plasticizer may affect the print quality.

The ink of the present invention can be prepared by any suitable method. In one embodiment of the ink composition comprising an oil modified polyamide binder resin, the desired amount of the ink concentrate, the film forming component, the oil, the surface active agent, the Theological additive, and the water flight agent are combined in a suitable mixer such as a HIDROBAT-10™ mixer from Premier Mill Corp. in Reading, Pa., until an ink of uniform consistency is obtained.

The following examples further illustrate the present invention but, of course, should not be construed as in any way limiting its scope.

EXAMPLE 1

This example illustrates the preparation of an ink concentrate with carbon black as the colorant.

The following ingredients were used:

|  | wt. % |
|---|---|
| Soybean oil, salad oil grade | 20.0 |
| HYDROCAL 750, oil | 17.5 |
| ZECO 11A, a Gilsonite resin | 14.0 |
| NYLIN #5, oil modified polyamide | 12.0 |
| LEXON 101, oxidized polyethylene | 1.5 |
| PRINTEX 300, carbon black | 35.0 |

The ink concentrate was prepared as follows: The soybean oil, HYDROCAL 750, and ZECO 11A were combined in a suitable mixer such as the Hidrobat-10 mixer, and stirred until the ZECO 11A resin was completely dissolved. The stirring was maintained for about 45 minutes at 170° C. The temperature was then reduced to 130° C., and LEXON 101 and NYLIN #5 were added. The mixing was continued for 15 minutes after the addition. The temperature was then reduced to 100° C., and the colorant was then slowly added with high speed mixing over a period of about 15 minutes. The mixing was continued for about 45 minutes after all of the colorant was added.

EXAMPLE 2

This example illustrates the preparation of another ink concentrate with carbon black as the colorant.

The following ingredients were used:

|  | wt. % |
|---|---|
| Soybean oil, salad oil grade | 20.0 |
| TUFFLO 2000, oil | 18.5 |
| ZECO 11A, a Gilsonite resin | 13.0 |
| NYLIN #5, oil modified polyamide | 12.0 |
| LEXON 101, oxidized polyethylene | 1.5 |
| PRINTEX 300, carbon black | 35.0 |

The ink concentrate was prepared following the procedure set forth in Example 1, except that TUFFLO 2000 was used instead of HYDROCAL 750.

EXAMPLE 3

This example illustrates the preparation of yet another ink concentrate with carbon black as the colorant.

The following ingredients were used:

|  | wt. % |
|---|---|
| Soybean oil, salad oil grade | 37.5 |
| ZECO 11A, a Gilsonite resin | 14.0 |
| NYLIN #5, oil modified polyamide | 12.0 |
| LEXON 101, oxidized polyethylene | 1.5 |
| PRINTEX 300, carbon black | 35.0 |

The ink concentrate was prepared following the procedure set forth in Example 1, except that no HYDROCAL 750 was used.

EXAMPLE 4

This example illustrates the preparation of yet another ink concentrate with carbon black as the colorant.

The following ingredients were used:

|  | wt. % |
|---|---|
| Soybean oil, salad oil grade | 20.0 |
| HYDROCAL 500, oil | 19.5 |
| ZECO 11A, a Gilsonite resin | 12.0 |
| NYLIN #5, oil modified polyamide | 12.0 |
| LEXON 101, oxidized polyethylene | 1.5 |
| PRINTEX 300, carbon black | 35.0 |

The ink concentrate was prepared following the procedure set forth in Example 1, except that HYDROCAL 500 was used instead of HYDROCAL 750.

EXAMPLE 5

This example illustrates the preparation of yet another ink concentrate with carbon black as the colorant.

The following ingredients were used:

|  | wt. % |
|---|---|
| Soybean oil, salad oil grade | 20.0 |
| TUFFLO 2000, oil | 14.5 |
| ZECO 11A, a Gilsonite resin | 14.0 |
| NYLIN #5, oil modified polyamide | 15.0 |
| LEXON 101, oxidized polyethylene | 1.5 |
| PRINTEX 300, carbon black | 35.0 |

The ink concentrate was prepared following the procedure set forth in Example 1, except that TUFFLO 2000 was used instead of HYDROCAL 750.

EXAMPLE 6

This example illustrates the preparation of a zero VOC version of the non-rub off ink of the present invention.

The following ingredients were used:

|  | wt. % |
| --- | --- |
| Ink concentrate from Example 1 | 60.0 |
| TUFFLO 2000, oil | 24.9 |
| TUFFLO 1200, oil | 11.3 |
| SPAN 85, surface active agent | 0.1 |
| CARBOSET, GA-1086 -styrene-acrylic copolymer | 1.5 |
| AQUAPEL 3, water flight agent | 2.0 |
| CLAYTONE HY, rheological additive | 0.2 |

In a suitable mixer, the ink concentrate and TUFFLO 2000 were mixed at low speed for 30 minutes. SPAN 85 was then added and mixed for 15 minutes at medium speed. GA-1086 was then added slowly, and mixed for 30 minutes after the addition. CLAYTONE HY and AQUAPEL 3 were then mixed in at high speeds for 15 minutes. Finally, TUFFLO 1200 was added and mixed for 40 minutes. The ink was then removed from the mixing pot and passed through a sock filter. The ink had a suitable viscosity and was found to be very stable.

EXAMPLE 7

This example illustrates the preparation of another zero VOC version of the non-rub off ink of the present invention.

The following ingredients were used:

|  | wt. % |
| --- | --- |
| Ink concentrate from Example 5 | 60.0 |
| TUFFLO 2000, oil | 30.4 |
| TUFFLO 10, oil | 5.0 |
| SPAN 85, surface active agent | 0.1 |
| CARBOSET, GA-1086 -styrene-acrylic copolymer | 1.0 |
| AQUAPEL 3, water flight agent | 2.0 |
| NIREZ 9012, TOFA ester | 1.5 |

The ink was prepared following the procedure set forth in Example 6, except NIREZ 9012 and TUFFLO 10 were used instead of TUFFLO 1200.

The ink had a suitable viscosity and was found to be very stable. The ink was tested on a GOSS COMMUNITY press and the ink produced fast drying image that has non-rub off as determined by the ANPA rub off test, high color strength, sharp halftone reproduction, fast ink setting, and good water balance. The ink required less fountain solution than conventional inks, yet misted less and did not dry on the press.

EXAMPLE 8

This example illustrates the preparation of yet another zero VOC version of the non-rub off ink of the present invention.

The following ingredients were used:

|  | wt. % |
| --- | --- |
| Ink concentrate from Example 1 | 60.0 |
| TUFFLO 10, oil | 10.0 |
| TUFFLO 1200, oil | 22.9 |
| SPAN 85, surface active agent | 0.1 |
| CARBOSET, GA-1086 -styrene-acrylic copolymer | 5.0 |

-continued

|  | wt. % |
| --- | --- |
| AQUAPEL 3, water flight agent | 2.0 |

The ink was prepared following the procedure set forth in Example 6, except that a combination TUFFLO 10 and TUFFLO 1200 was used instead of the combination of TUFFLO 2000 and TUFFLO 1200. The ink had a suitable viscosity and was found to be very stable.

EXAMPLE 9

This example illustrates the preparation of yet another non-zero VOC version of the non-rub off ink of the present invention.

The following ingredients were used:

|  | wt. % |
| --- | --- |
| Ink concentrate from Example 1 | 60.0 |
| TUFFLO 2000, oil | 29.4 |
| TUFFLO 10, oil | 6.0 |
| SPAN 85, surface active agent | 0.1 |
| CARBOSET, GA-1086 -styrene-acrylic copolymer | 1.5 |
| TXIB, Diisobutyrate | 1.5 |
| AQUAPEL 3, water flight agent | 1.5 |

The ink was prepared following the procedure set forth in Example 6. A combination of TUFFLO 2000 and TUFFLO 10 was used instead of the combination of TUFFLO 2000 and TUFFLO 1200. In addition, the ink composition included TXIB. The ink had a suitable viscosity and was found to be very stable.

EXAMPLE 10

This example illustrates the preparation of a non-zero VOC version of the non-rub off ink of the present invention.

The following ingredients were used:

|  | wt. % |
| --- | --- |
| Ink concentrate from Example 1 | 57.0 |
| TUFFLO 10, oil | 29.0 |
| SPAN 85, surface active agent | 0.1 |
| CARBOSET, GA-1086 -styrene-acrylic copolymer | 5.0 |
| CLAYTONE HY, rheological additive | 0.25 |
| AQUAPEL 3, water flight agent | 2.0 |
| NIREZ 9012, TOFA ester | 7.0 |

The ink was prepared following the procedure set forth in Example 6, except that TUFFLO 10 and NIREZ 9012 were used instead of TUFFLO 1200 and TUFFLO 2000. The ink had a suitable viscosity and was found to be very stable.

EXAMPLE 11

This example illustrates the preparation of yet another non-zero VOC version of the non-rub off ink of the present invention.

The following ingredients were used:

|  | wt. % |
|---|---|
| Ink concentrate from Example 1 | 55.0 |
| HYDROCAL-300, oil | 20.6 |
| TUFFLO 10, oil | 17.0 |
| SPAN 85, surface active agent | 0.2 |
| CARBOSET, GA-1086 -styrene-acrylic copolymer | 5.0 |
| CLAYTONE HY, rheological additive | 0.2 |
| AQUAPEL 3, water flight agent | 2.0 |

The ink was prepared following the procedure set forth in Example 6, except that HYDROCAL 300 and TUFFLO 10 were used instead of TUFFLO 2000 and TUFFLO 1200. The ink had a suitable viscosity and was found to be very stable.

EXAMPLE 12

This example illustrates the preparation of another non-zero VOC version of the non-rub off ink of the present invention.

The following ingredients were used:

|  | wt. % |
|---|---|
| Ink concentrate from Example 1 | 60.0 |
| TUFFLO 2000, oil | 30.0 |
| TUFFLO 1200, oil | 11.5 |
| SPAN 85, surface active agent | 0.1 |
| CARBOSET, GA-1086 -styrene-acrylic copolymer | 1.5 |
| NIREZ 9012, TOFA ester | 3.0 |
| TXIB, Diisobutyrate | 1.5 |

The ink was prepared following the procedure set forth in Example 6, except for the changes in the ingredients.

The ink had a suitable viscosity and was found to be very stable.

EXAMPLE 13

This example illustrates the preparation of another non-zero VOC version of the non-rub off ink of the present invention.

The following ingredients were used:

|  | wt. % |
|---|---|
| Ink concentrate from Example 1 | 60.0 |
| TUFFLO 750, oil | 15.0 |
| TUFFLO 300, oil | 10.0 |
| SPAN 85, surface active agent | 0.3 |
| CARBOSET, GA-1086 -styrene-acrylic copolymer | 5.0 |
| NIREZ 9012, TOFA ester | 10.0 |
| AQUAPEL 3, water flight agent | 2.0 |
| CLAYTONE HY, rheological additive | 0.25 |

The ink was prepared following the procedure set forth in Example 6, except for the changes in the ingredients.

The ink had a suitable viscosity and was found to be very stable.

EXAMPLE 14

This example illustrates the preparation of another non-zero VOC version of the non-rub off ink of the present invention.

The following ingredients were used:

|  | wt. % |
|---|---|
| Ink concentrate from Example 1 | 60.0 |
| TUFFLO 2000, oil | 10.0 |
| Mineral Seal Oil, oil | 22.2 |
| SPAN 85, surface active agent | 0.3 |
| CARBOSET, GA-1086 -styrene-acrylic copolymer | 5.0 |
| AQUAPEL 3, water flight agent | 2.0 |
| CLAYTONE HY, rheological additive | 0.5 |

The ink was prepared following the procedure set forth in Example 6, except that Mineral Seal Oil was used in place of TUFFLO 1200. The ink had a suitable viscosity and was found to be very stable.

EXAMPLE 15

This example illustrates the preparation of another non-zero VOC version of the non-rub off ink of the present invention.

The following ingredients were used:

|  | wt. % |
|---|---|
| Ink concentrate from Example 1 | 60.0 |
| TUFFLO 2000, oil | 6.0 |
| Mineral Seal Oil, oil | 24.5 |
| SPAN 85, surface active agent | 0.5 |
| CARBOSET, GA-1086 -styrene-acrylic copolymer | 5.0 |
| AQUAPEL 3, water flight agent | 3.0 |
| CLAYTONE HY, rheological additive | 1.0 |

The ink was prepared following the procedure set forth in Example 6, except that Mineral Seal Oil was used instead of TUFFLO 1200. The ink had a suitable viscosity and was found to be very stable.

EXAMPLE 16

This example illustrates the preparation of another non-zero VOC version of the non-rub off ink of the present invention.

The following ingredients were used:

|  | wt. % |
|---|---|
| Ink concentrate from Example 1 | 50.0 |
| Blown Castor Oil, oil Süd-Chemie Z-1 | 0.75 |
| TUFFLO 2000, oil | 35.0 |
| SPAN 80, surface active agent | 0.3 |
| CARBOSET, GA-1086 -styrene-acrylic copolymer | 15.0 |

The ink was prepared following the procedure set forth in Example 6, except for the change in ingredients. The ink had a suitable viscosity and was found to be very stable.

EXAMPLE 17

This example illustrates the preparation of another non-zero VOC version of the non-rub off ink of the present invention.

The following ingredients were used:

|  | wt. % |
|---|---|
| Ink concentrate from Example 1 | 55.0 |
| Blown Castor Oil, oil Süd-Chemie Z-1 | 1.0 |
| TUFFLO 2000, oil | 25.0 |
| SPAN 80, surface active agent | 0.5 |
| CLAYTONE HY, rheological additive | 1.0 |
| CARBOSET, GA-1086 -styrene-acrylic copolymer | 15.0 |

The ink was prepared following the procedure set forth in Example 6, except for the change in the ingredients. The ink had a suitable viscosity and was found to be very stable.

EXAMPLE 18

This example illustrates the preparation of another non-zero VOC version of the non-rub off ink of the present invention The following ingredients were used:

|  | wt % |
|---|---|
| Ink concentrate from Example 1 | 55.0 |
| Blown Castor Oil, oil Sud-Chemie Z-1 | 1.0 |
| TUFFLO 2000, oil | 25.0 |
| Mineral Seal Oil, oil | 3.0 |
| SPAN 80, surface active agent | 0.5 |
| CARBOSET, GA-1086- styrene-acrylic copolymer | 22.0 |
| CLAYTONE HY, rheological additive | 1.0 |

The ink was prepared following the procedure set forth in Example 6, except for the change in the ingredients. The ink had a suitable viscosity and was found to be stable.

EXAMPLE 19

This example illustrates a method of producing an embodiment of the ink concentrate of the present invention using a continuous process. The ink concentrate was prepared as follows. A dispersion vehicle and a second dispersion vehicle (or let down vehicle) were first prepared. The dispersion vehicle and the let down vehicle thus prepared were combined with the colorant in a mixer as described below.

The following ingredients were used in the preparation of the ink concentrate:

|  | wt. % |
|---|---|
| TUFFLO 2000 oil | 31.6 |
| PIONEER 442 | 11.8 |
| TERLON #5 | 13.6 |
| Blown castor oil Z-3 | 2.0 |
| PANTHER 17 | 41.0 |

The dispersion vehicle was prepared as follows using the following ingredients:

|  | wt. % |
|---|---|
| TUFFLO 2000 oil | 51.4 |
| PIONEER 442 | 20.0 |
| TERLON #5 | 22.9 |
| Blown castor oil Z-3 | 5.7 |

The required quantity of TUFFLO 2000 oil was taken in a suitable mixing tank such as the STA-WARM™ Electrically Heated Equipment, type 8ZT, Sta-Warm Electric Co. Inc., Ravenia, Ohio. The oil was heated with continuous stirring. When the temperature reached 250° F., the required quantity of PIONEER 442 resin was added slowly with stirring. After the addition of the PIONEER 442 resin was complete, the temperature was increased to 330° F, and the mixing was continued until the PIONEER resin was completely dissolved. The PIONEER 442/TUFFLO oil solution thus prepared was then pumped through a 1 μm filter into a clean tank to remove any undissolved impurities.

The required quantities of filtered pioneer 442/TUFFLO oil solution and blown castor oil Z-3 were combined in a suitable container fitted with a mixer, and heated to about 220° F. The required quantity of TERLON #5 was then added slowly with stirring. After the addition of the polyester resin was complete, the temperature was reduced to 200° F. and maintained at this temperature until the preparation of the ink concentrate.

The let down vehicle was prepared using the procedure used to prepare the dispersion vehicle using the following ingredients.

|  | wt. % |
|---|---|
| TUFFLO 2000 oil | 56.7 |
| PIONEER 442 | 20.0 |
| TERLON #5 | 23.3 |

The ink concentrate was prepared using the Teledyne continuous processor described earlier. The following parameters were employed.

| | |
|---|---|
| dispersion vehicle flow rate: | 1.58 lb/min. |
| letdown vehicle flow rate: | 1.10 lb/min. |
| carbon black feed rate: | 1.87 lb/min. |
| processor input temperature: | 240–270° F. |
| processor mixing temperature: | 230–250° F. |
| processor output temperature: | 225–245° F. |
| Amps | 44–46 |

The dispersion vehicle, the let down vehicle, and the carbon black pellets were fed to the continuous processor simultaneously and continuously at the aforesaid rates. The processor input temperature is the temperature measured at a point near where the dispersion vehicle and the carbon black pellets are fed into the processor. The processor mixing temperature is the temperature measured at a point where the three ingredients undergo mixing and grinding. The processor output temperature is the measured temperature of the ink concentrate before it exits the processor.

The ink concentrate thus prepared was found to have narrow particle size distribution with a mean size of 0.19 μm as measured by Horiba LA-900 Laser scattering particle size Distribution Analyzer, Horiba Ltd., Kyoto, Japan. The ink thus prepared is substantially free of agglomerates. The ink concentrate also was found to have zero scratch as determined by the NPIRI Grindometer (ASTM D 1316–93). The VOC content was found to be very low (0.46% by weight of the concentrate) as determined by EPA method 24.

A printing ink composition was prepared using the ink concentrate prepared above. The following ingredients were used.

|  | wt. % |
|---|---|
| Ink concentrate | 49.5 |
| TUFFLO 2000 oil | 49.5 |
| Blown castor oil Z-3 | 1.0 |

In a suitable mixer such as the HIDROBAT-10 mixer, the above ingredients were combined and mixed at a low speed for about 1 hour to 2 hours, the actual time of mixing varying with the size of the batch prepared, larger batches requiring longer mixing. The mixing speed was approximately 200 rpm. The ink thus prepared was then pumped through a 5 μm sock filter to remove any impurities. The ink had rheological characteristics suitable for use as a news printing ink. The ink had a viscosity of 92 poises, an yield value of 1591 dynes/cm$^2$, and a tack value of 6.4 (1 min. 1200 rpm inkometer, 90° F.). The viscosity and yield value were obtained at 25° C. on a Brookfield Viscometer Model HP using a CP-52 spindle and the Bingham Law Program.

EXAMPLE 20

This example illustrates the preparation of another embodiment of the inventive ink concentrate using the continuous process.

The ink concentrate was prepared using the following ingredients:

|  | wt. % |
|---|---|
| TUFFLO 2000 oil | 38.5 |
| PIONEER 442 | 12.5 |
| TERLON #5 | 15.9 |
| Blown castor oil Z-3 | 2.0 |
| PANTHER 17 | 31.1 |

A dispersion vehicle was prepared using the following ingredients by following the procedure illustrated in Example 19.

|  | wt. % |
|---|---|
| TUFFLO 2000 oil | 51.4 |
| PIONEER 442 | 20.0 |
| TERLON #5 | 22.9 |
| Blown castor oil Z-3 | 5.7 |

A let down vehicle was prepared using the following ingredients by following the procedure illustrated in Example 19.

|  | wt. % |
|---|---|
| TUFFLO 2000 oil | 60.3 |
| PIONEER 442 | 16.4 |
| TERLON #5 | 23.3 |

The ink concentrate was prepared using the Teledyne continuous processor using the following parameters.

dispersion vehicle flow rate: 2.01 lb/min.

letdown vehicle flow rate: 2.10 lb.min.

carbon black feed rate: 1.87 lb/min.

processor input temperature: 230–250° F.

processor mixing temperature: 230–250° F.

processor output temperature: 225–245° F.

Amps 44–46

The ink concentrate was found to have a narrow particle size distribution with a mean size of 0.19 μm as measured by the Horiba LA-900 Laser scattering particle size Distribution Analyzer, and zero scratch as determined by the NPIRI Grindometer (ASTM D 1316–93). This ink concentrate is softer than the ink concentrate illustrated in Example 19 due to the presence of a greater quantity of the naphthenic oil in the concentrate.

An ink composition was prepared using the following ingredients:

|  | wt. % |
|---|---|
| Ink concentrate | 55.0 |
| TUFFLO 2000 oil | 44.0 |
| Blown castor oil Z-3 | 1.0 |

The ink was prepared following the procedure set forth in Example 19. The ink thus prepared had rheological characteristics similar to that of Example 19, and was suitable for use as a news printing ink.

EXAMPLE 21

This example illustrates a direct method of preparing the news printing ink without the need to first prepare an ink concentrate.

The ink was prepared using the following ingredients:

|  | wt. % |
|---|---|
| TUFFLO 2000 oil | 65.2 |
| PIONEER 442 | 6.8 |
| TERLON #5 | 8.7 |
| Blown castor oil Z-3 | 2.1 |
| PANTHER 17 | 17.2 |

A dispersion vehicle was prepared as described in Example 19 using the following ingredients.

|  | wt. % |
|---|---|
| TUFFLO 2000 oil | 48.5 |
| PIONEER 442 | 18.8 |
| TERLON #5 | 21.5 |
| Blown castor oil Z-3 | 11.2 |

A let down vehicle was prepared as described in Example 19 using the following ingredients.

|  | wt. % |
|---|---|
| TUFFLO 2000 oil | 87.3 |
| PIONEER 442 | 5.3 |
| TERLON #5 | 7.4 |

The ink was prepared in the Teledyne continuous processor using the following parameters:

| | |
|---|---|
| dispersion vehicle flow rate: | 2.00 lb/min. |
| letdown vehicle flow rate: | 7.00 lb/min. |
| carbon black feed rate: | 1.87 lb/min. |
| processor input temperature: | 215–230° F. |
| processor mixing temperature: | 225–240° F. |
| processor output temperature: | 210–220° F. |
| Amps | 42–44 |

The ink thus prepared was collected in a clean drum and then pumped through a 5 μm sock filter to remove any impurities. The ink thus prepared had a narrow particle size distribution with a mean size of 0.19 μm and Theological characteristics similar to that of Example 19, and was suitable for use as a news printing ink.

The present invention provides a printing ink comprising an ink concentrate in an amount of from about 30% by weight to about 70% by weight of the ink, a styrene-acrylic copolymer in an amount of from about 3% by weight to about 8% by weight of the ink, a surface active agent in an amount of from about 0.05% by weight to about 1% by weight of the ink, a light oil in an amount of from about 5% by weight to about 20% by weight of the ink, and a mineral oil in an amount of from about 0% by weight to about 25% by weight of the ink.

The present invention further provides a printing ink comprising an ink concentrate in an amount of from about 30% by weight to about 70% by weight of the printing ink, a styrene-acrylic copolymer in an amount of from about 3% by weight to about 8% by weight of the printing ink, a surface active agent in an amount of from about 0.05% by weight to about 1% by weight of the printing ink, and a saturated oil in an amount of from about 30% by weight to about 70% by weight of the printing ink.

The present invention further provides an ink concentrate comprising a naphthenic oil in an amount of from about 30% by weight to about 50% by weight of the ink concentrate, a colorant in an amount of from about 25% by weight to about 45% by weight of the ink concentrate, a hydrocarbon resin in an amount of from about 6% by weight to about 20% by weight of the ink concentrate, a blown castor oil in an amount of from about 1% by weight to about 6% by weight of the ink concentrate, and a polyester-oil binder resin in an amount of from about 5% by weight to about 20% by weight of the ink concentrate.

The present invention also provides an improved printing process for producing at a reasonable cost non-rub off prints having high color strength, good water balance, and sharp halftone reproduction, the improvement comprising using the non-rub off printing ink of the instant invention.

The present invention also provides an improved printing process for producing at a reasonable cost non-rub off prints having high color strength, good water balance, and sharp halftone reproduction, the improvement comprising using the printing ink of the present invention comprising a colorant having a particle size of from about 0.01 μm to about 25 μm, a vegetable oil, an oil modified polyamide, and a film forming component that is a polymer comprising both hydrophilic and hydrophobic groups.

The hydrophilic group of the film forming component is preferably selected from the group consisting of acrylic acid, methacrylic acid, hydroxyethylacrylic acid, hydroxyethylmethacrylic acid, hydroxymethylacrylate, hydroxyethylacrylate, hydroxyethyl methacrylate, ethylene oxide, and hydrolyzed vinylacetate. The hydrophobic group is preferably selected from the group consisting of ethylene, propylene, butylene, styrene, tetrafluoroethylene, chlorotrifluoroethylene, and acrylates of alcohols having about 1–20 carbon atoms.

The present invention further provides an improved printing process for producing at a reasonable cost non-rub off prints having high color strength, good water balance, and sharp halftone reproduction, the improvement comprising using the printing ink of the present invention comprising a colorant having a particle size of from about 0.01 μm to about 25 μm, a vegetable oil, a hydrocarbon resin, an oil modified polyamide, and a styrene-acrylic copolymer.

The present invention further provides a printing ink comprising an ink concentrate wherein the ink concentrate comprises the naphthenic oil in an amount of from about 30% by weight to about 50% by weight of the ink concentrate, the colorant in an amount of from about 25% by weight to about 45% by weight of the ink concentrate, the hydrocarbon resin in an amount of from about 6% by weight to about 20% by weight of the ink concentrate, the blown castor oil in an amount of from about 1% by weight to about 6% by weight of the ink concentrate, and the binder resin in an amount of from about 5% by weight to about 20% by weight of the ink concentrate.

The present invention further provides a printing ink wherein a naphthenic oil is present in an amount of from about 40% by weight to about 70% by weight of the printing ink, an ink concentrate in an amount of from about 30% by weight to about 70% by weight of the printing ink, and a blown castor oil is present in an amount of from about 0.5% by weight to about 4% by weight of the printing ink.

The present invention further provides a printing ink wherein a naphthenic oil is present in an amount of from about 40% by weight to about 70% by weight of the ink, a colorant is present in an amount of from about 10% by weight to about 30% by weight of the ink, a hydrocarbon resin in an amount of from about 5% by weight to about 12% by weight of the ink, a blown castor oil in an amount of from about 0.5% by weight to about 4% by weight of the ink, and a polyester-oil polymer in an amount of from about 5% by weight to about 15% by weight of the ink.

The present invention further provides a process for preparing a non-rub off printing ink comprising (a) preparing a first dispersion vehicle comprising a naphthenic oil, a hydrocarbon resin, a polyester-oil polymer, and a dispersing agent; (b) preparing an ink concentrate by combining the first dispersion vehicle and a colorant having a particle size of from about 0.01 μm to about 25 μm; and (c) combining the ink concentrate with a naphthenic oil and a dispersing agent.

The present invention further provides a process for preparing an ink composition as described above and further comprising preparing a second dispersion vehicle comprising a naphthenic oil, a hydrocarbon resin, and a polyester-oil polymer, and the ink concentrate is prepared by combining the first dispersion vehicle, the second dispersion vehicle, and the colorant.

The present invention further provides a process of preparing an ink composition as described above wherein the ink concentrate is prepared by feeding the first dispersion vehicle and the colorant continuously to a mixer, subjecting the first dispersion vehicle and the colorant in the mixer to high shear forces to obtain an ink concentrate substantially free of agglomerates, and concurrently extruding the dispersion substantially free of agglomerates from a region of high shear to a region of low shear.

The present invention further provides a process as described above wherein the ink concentrate is prepared by feeding the first dispersion vehicle, the second dispersion vehicle, and the colorant continuously to a mixer, subjecting the first dispersion vehicle, the second dispersion vehicle, and the colorant in the mixer to high shear forces to obtain the ink concentrate substantially free of agglomerates, and concurrently extruding the ink concentrate from a region of high shear to a region of low shear.

The present invention further provides a process for preparing a non-rub off printing ink comprising (a) preparing a first dispersion vehicle comprising a naphthenic oil, a hydrocarbon resin, a polyester-oil polymer, and a dispersing agent; (b) preparing a second dispersion vehicle comprising a naphthenic oil, a hydrocarbon resin, and a polyester-oil polymer; and (c) combining said first and second dispersion vehicles with a colorant having a particle size of from about 0.01 μm to about 25 μm.

The present invention further provides a process for preparing a printing ink as described above wherein the ink is prepared by feeding the first dispersion vehicle, the second dispersion vehicle, and the colorant continuously to a mixer, subjecting the first dispersion vehicle, the second dispersion vehicle, and the colorant in the mixer to high shear forces to obtain the ink, and concurrently extruding the ink from a region of high shear to a region of low shear.

The present invention further provides ink concentrates and inks prepared by the processes described above.

All of the references, including patents, patent applications, and publications cited herein, are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. An ink concentrate comprising a colorant having a particle size of from about 0.01 μm to about 25 μm, a hydrocarbon resin, an oxidized polyethylene, and a binder resin selected from the group consisting of a drying oil modified polyamide and a drying oil modified polyester wherein the drying oil is covalently attached to the polyamide and the polyester.

2. The ink concentrate of claim 1, wherein said colorant comprises carbon black.

3. The ink concentrate of claim 2, wherein said binder resin is a drying oil modified polyamide.

4. The ink concentrate of claim 3, further comprising a vegetable oil.

5. The ink concentrate of claim 4, wherein said hydrocarbon resin has a softening point of from about 135° C. to about 205° C.

6. The ink concentrate of claim 5, wherein said vegetable oil comprises soya oil.

7. The ink concentrate of claim 6, wherein said drying oil modified polyamide has a viscosity of about 240–960 seconds at 77° F. (Bubble Tube).

8. The ink concentrate of claim 7, wherein said oxidized polyethylene has a viscosity of from about 10 centipoises (cps) to about 100 cps at 300° F. according to ASTM D-3236.

9. The ink concentrate of claim 8, wherein said carbon black has a particle size of from about 0.02 μm to about 0.08 μm.

10. The ink concentrate of claim 9, wherein said hydrocarbon resin has a ring and ball softening point of about 149–157° C.

11. The ink concentrate of claim 10, wherein said ink concentrate comprises said vegetable oil in an amount of from about 10% by weight to about 40% by weight of said ink concentrate, said carbon black in an amount of from about 30% by weight to about 40% by weight of said ink concentrate, said hydrocarbon resin in an amount of from about 10% by weight to about 20% by weight of said ink concentrate, said drying oil modified polyamide in an amount of from about 10% by weight to about 18% by weight of said ink concentrate, and said oxidized polyethylene in an amount of from about 1% by weight to about 2% by weight of said ink concentrate.

12. The ink concentrate of claim 10, wherein said ink concentrate further comprises a saturated oil having a viscosity of from about 100 SUS to about 2400 SUS at 100° F.

13. The ink concentrate of claim 12, wherein said ink concentrate comprises said vegetable oil in an amount of from about 18% by weight to about 22% by weight of said ink concentrate, said carbon black in an amount of from about 30% by weight to about 40% by weight of said ink concentrate, said hydrocarbon resin in an amount of from about 10% by weight to about 20% by weight of said ink concentrate, said drying oil modified polyamide in an amount of from about 10% by weight to about 18% by weight of said ink concentrate, said saturated oil in an amount of from about 15% by weight to about 40% by weight of said ink concentrate, and said oxidized polyethylene in an amount of from about 1% by weight to about 2% by weight of said ink concentrate.

14. The ink concentrate of claim 2, wherein said binder resin is a drying oil modified polyester.

15. The ink concentrate of claim 14, wherein said drying oil modified polyester has a viscosity of about 25–960 seconds at 77° F. (Bubble Tube).

16. The ink concentrate of claim 15, wherein said hydrocarbon resin has a ring and ball softening point of about 151–157° C.

17. The ink concentrate of claim 16, further comprising a naphthenic oil.

18. The ink concentrate of claim 17, further comprising a blown castor oil.

19. The ink concentrate of claim 18, wherein said ink concentrate comprises said naphthenic oil in an amount of from about 30% by weight to about 50% by weight of said ink concentrate, said colorant in an amount of from about 25% by weight to about 45% by weight of said ink concentrate, said hydrocarbon resin in an amount of from about 6% by weight to about 20% by weight of said ink concentrate, said blown castor oil in an amount of from about 1% by weight to about 6% by weight of said ink concentrate, and said binder resin in an amount of from about 5% by weight to about 20% by weight of said ink concentrate.

20. The ink concentrate of claim 14, wherein said carbon black has a particle size of from about 0.02 μm to about 0.08 μm.

21. A printing ink comprising a naphthenic oil and an ink concentrate comprising a colorant having a particle size of from about 0.01 μm to about 25 μm, a hydrocarbon resin, an oxidized polyethylene, and a drying oil modified polyester wherein the drying oil is covalently attached to the polyester.

22. The printing ink of claim 21, wherein said colorant comprises carbon black.

23. The printing ink of claim 22, wherein said carbon black has a particle size of from about 0.02 μm to about 0.08 82 m.

24. The printing ink of claim 23, wherein said hydrocarbon resin has a ring and ball softening point of about 151–157° C.

25. The printing ink of claim 24, wherein said ink concentrate further comprises a naphthenic oil.

26. The printing ink of claim 25, wherein said ink concentrate further comprises a blown castor oil.

27. The printing ink of claim 26, wherein said ink concentrate comprises said naphthenic oil in an amount of from about 30% by weight to about 50% by weight of said ink concentrate, said colorant in an amount of from about 25% by weight to about 45% by weight of said ink concentrate, said hydrocarbon resin in an amount of from about 6% by weight to about 20% by weight of said ink concentrate, said blown castor oil in an amount of from about 1% by weight to about 6% by weight of said ink concentrate, said oxidized polyethylene in an amount of from about 1% by weight to about 3% by weight of said ink concentrate, and said drying oil modified polyester in an amount of from about 5% by weight to about 20% by weight of said ink concentrate.

28. The printing ink of claim 27, further comprising a blown castor oil.

29. The printing ink of claim 28, wherein said naphthenic oil is present in an amount of from about 40% by weight to about 70% by weight of said printing ink, said ink concentrate is present in an amount of from about 30% by weight to about 70% by weight of said printing ink, and said blown castor oil is present in an amount of from about 0.5% by weight to about 4% by weight of said printing ink.

* * * * *